United States Patent
Nickerson et al.

(10) Patent No.: US 11,263,076 B2
(45) Date of Patent: Mar. 1, 2022

(54) METHODS AND DEVICES FOR DECODING QUANTUM STATES

(71) Applicant: PSIQUANTUM CORP., Palo Alto, CA (US)

(72) Inventors: Naomi Nickerson, San Francisco, CA (US); Nicolas Delfosse, Ingre (FR)

(73) Assignee: PSIQUANTUM CORP., Palo Alto, CA (US)

( * ) Notice: Subject to any disclaimer, the term of this patent is extended or adjusted under 35 U.S.C. 154(b) by 241 days.

(21) Appl. No.: 16/728,952

(22) Filed: Dec. 27, 2019

(65) Prior Publication Data

US 2021/0124640 A1 Apr. 29, 2021

Related U.S. Application Data

(63) Continuation of application No. PCT/IB2018/000711, filed on Jul. 4, 2018.

(60) Provisional application No. 62/527,825, filed on Jun. 30, 2017, provisional application No. 62/528,140, filed on Jul. 2, 2017.

(51) Int. Cl.
  *G11C 29/00* (2006.01)
  *G06F 11/10* (2006.01)
  *G06N 10/00* (2022.01)

(52) U.S. Cl.
  CPC ............ *G06F 11/10* (2013.01); *G06N 10/00* (2019.01)

(58) Field of Classification Search
  CPC .................................. G06F 11/10; G06N 10/00
  See application file for complete search history.

(56) References Cited

U.S. PATENT DOCUMENTS

2020/0401927 A1* 12/2020 Nickerson ............. H03M 13/29

OTHER PUBLICATIONS

Delfosse, et al., Linear-Time Maximum Likelihood Decoding of Surface Codes Over the Quantum Erasure Channel, arXiv:1703.01517v1 [quant-ph], Mar. 2017, 6 pgs.
Dennis, Eric, Purifying Quantum States: Quantum and Classical Algorithms, arXiv:quant-ph/0503169v1, Mar. 21, 2005, 116 pgs.
PsiQuantum Corp., International Search Report and Written Opinion, PCTIB2018000711, dated Nov. 26, 2018, 21 pgs.

* cited by examiner

*Primary Examiner* — Samir W Rizk
(74) *Attorney, Agent, or Firm* — Morgan, Lewis & Bockius LLP

(57) ABSTRACT

A method and a device for correcting quantum state information are disclosed. A decoder receives information identifying syndrome values for a plurality of entangled qubit states represented by a graph state with a respective edge of the graph state corresponding to a respective qubit state of the plurality of entangled qubit states. The decoder repeats identifying one or more clusters of qubit states and/or syndrome states in the graph state until all of the one or more identified clusters are determined to be valid while increasing a size of a respective cluster each time the identifying operation is performed. The decoder reconstructs one or more qubit states and/or syndrome states for respective clusters; and stores information identifying the one or more reconstructed qubit states and/or syndrome states.

20 Claims, 23 Drawing Sheets

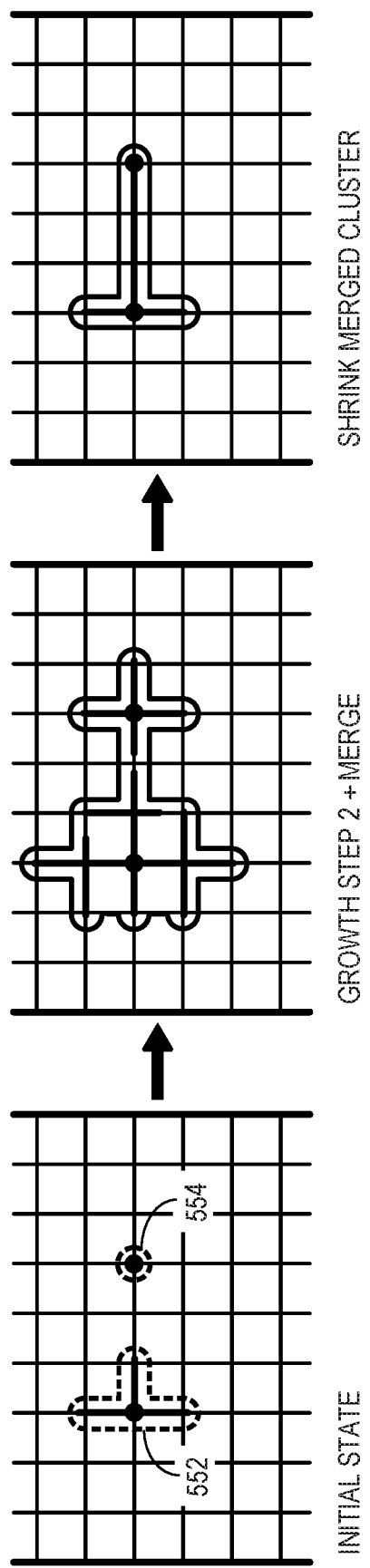

700

702 Receive information identifying syndrome values for a plurality of entangled qubit states represented by a lattice structure with a respective edge of the lattice structure corresponding to a respective qubit state of the plurality of entangled qubit states, the lattice structure having at least one boundary with open edges

704 identifying one or more clusters of qubit states and/or syndrome states in the lattice structure

706 Repeat the identifying operation until all of the one or more identified clusters are determined to be valid, at least one cluster of the one or more clusters identified at n+1 generation including a corresponding cluster of the one or more clusters identified at n generation and at least a portion of qubit states and/or syndrome states adjacent, in the lattice structure, to the corresponding cluster of the one or more clusters, including: determining, based on a parity of a respective cluster that is not adjacent to a boundary with open edges, whether the respective cluster is valid; and determining that a respective cluster that is adjacent to a boundary with open edges is valid regardless of a parity of the respective cluster

708 Determine, based on the parity of the respective cluster that is not adjacent to a boundary with open edges, whether the respective cluster is valid includes determining that the respective cluster is valid in accordance with a determination that the parity of the respective cluster that is not adjacent to a boundary with open edges is even and determining that the respective cluster is invalid in accordance with a determination that the parity of the respective cluster that is not adjacent to a boundary with open edges is odd

710 Generate a data structure that includes a cluster identifier for a respective vertex or a respective edge of the lattice structure

712 In accordance with a determination that two or more clusters have one or more connecting qubit states and/or syndrome states, merge the two or more clusters

714 Reconstruct one or more qubit states and/or syndrome states for a respective set of multiple clusters that are deemed to be valid based on qubit states and/or syndrome states adjacent to the respective set of multiple clusters

716 Store information identifying the one or more reconstructed qubit states and/or syndrome states

802 Receive information identifying syndrome values for a first plurality of entangled qubit states represented by a first lattice structure with a respective edge of the first lattice structure corresponding to a respective qubit state

804 Repeat, for N generations, identifying one or more clusters of qubit states and/or syndrome states in the first lattice structure until all of the one or more identified clusters are determined to be valid, including increasing a size of a respective cluster each time the identifying operation is performed so that the respective cluster at n+1 generation includes the respective cluster at n generation and at least a portion of qubit states and/or syndrome states adjacent, in the first lattice structure, to the respective cluster at n generation

806 Combine at least a portion of the information identifying the syndrome values for the first plurality of entangled qubit states and information identifying syndrome values for a second plurality of entangled qubit states that are adjacent to the first plurality of entangled qubit states, at least the portion of the first plurality of entangled qubit states and the second plurality of entangled qubit states being collectively represented by a second lattice structure, the second lattice structure including at least a portion of the first boundary within a non-boundary region of the second lattice structure

808 Repeat identifying one or more clusters of qubit states and/or syndrome states, in the second lattice structure, until all of the one or more identified clusters are determined to be valid, including identifying, initially, at least a subset of the one or more clusters, in the first lattice structure, identified at a generation prior to the N generation as at least a subset of the one or more clusters in the second lattice structure, and increasing a size of a respective cluster each time the identifying operation is performed

810 Repeating identifying one or more clusters in the second lattice structure includes identifying, initially, the one or more clusters, in the first lattice structure, identified at N-k generation, k being equal to, or greater than, m

812 Reconstruct one or more qubit states and/or syndrome states for a respective cluster of the one or more identified clusters based on qubit states and/or syndrome states adjacent to the respective cluster of the one or more identified clusters

814 Store information identifying the one or more reconstructed qubit states and/or syndrome states

902 Receive information identifying syndrome values for a first plurality of entangled qubit states represented by a lattice structure with a respective edge of the first lattice structure corresponding to a respective qubit state

904 Identify a first set of multiple clusters of qubit states and/or syndrome states in the lattice structure, the first set of multiple clusters including a first cluster and a second cluster that is distinct and separate from the first cluster

906 In accordance with a determination that at least one cluster of the first set of multiple clusters is determined to be invalid, identify a second set of multiple clusters of qubit states and/or syndrome states in the lattice structure, the second set of multiple clusters including a third cluster and the second cluster, the third cluster including the first cluster and at least a portion of qubit states and/or syndrome states adjacent, in the lattice structure, to the first cluster

908 In accordance with a determination that at least one cluster of the second set of multiple clusters is determined to be invalid, identify a third set of multiple clusters in the lattice structure

910 In accordance with a determination that at least one cluster of the second set of multiple clusters is determined to be invalid, identify a fourth set of multiple clusters in the lattice structure

912 In in accordance with a determination that at least one cluster of the second set of multiple clusters is determined to be invalid, identifying a fifth set of multiple clusters in the lattice structure

914 Reconstruct one or more qubit states and/or syndrome states for a respective set of multiple clusters that are deemed to be valid based on qubit states and/or syndrome states adjacent to the respective set of multiple clusters that are deemed to be valid

916 Store information identifying the one or more reconstructed qubit states and/or syndrome states

Figure 9

METHODS AND DEVICES FOR DECODING QUANTUM STATES

RELATED APPLICATIONS

This application is a continuation application of the International Application Serial No. PCT/IB2018/000711, filed Jul. 4, 2018, which claims priority to U.S. Provisional Patent Application Ser. No. 62/527,825, filed Jun. 30, 2017 and U.S. Provisional Patent Application Ser. No. 62/528,140, filed Jul. 2, 2017. All of these applications are incorporated by reference herein in their entireties.

BACKGROUND

In order to protect encoded digital information from noise and errors, a single logical bit can be encoded using many physical bits. The number of physical bits used to encode the single logical bit and the mathematical and/or geometrical structure of the collection of physical bits used to encode the logical bit is referred to as an error correcting code, also referred to herein as a code, and several examples exist of such codes in the case of classical computers. For example, the repetition code encodes a protected logical bit as an array of physical bits, each physical bit being a copy of the logical bit that is to be encoded. To retrieve the logical bit value from the encoded physical bits, a decoder is used. For example, the repetition code can be decoded using a majority rule decoder.

Not unlike the classical logical bits used to encode classical information in digital classical computers, encoding quantum bits within quantum error correcting codes can be beneficial to protect the underlying quantum information encoded in the quantum bits. In fact, error correction is even more essential in quantum information which is extremely sensitive to errors and loss. However, unlike classical information, the laws of quantum mechanics prevent quantum information from being copied, and therefore simple codes such as the repetition code are not possible. Moreover, for quantum error correcting codes to be practical, restrictions arise on the physical operations that can be carried out.

As a result, the problems of quantum decoding and quantum error correction have received much attention in recent years. Topological codes, such as the surface code, are the most practical quantum error correcting codes currently known. For these codes, there is in general a trade-off between the speed at which the decoding computation can be performed and the tolerance to errors that can be achieved. The minimum weight perfect matching (MWPM) decoder is normally considered to be the best option for practical applications. The complexity of the MWPM algorithm is $O(N^3)$, where N is the number of qubits in the system. While this is polynomial, the algorithm is fairly complex and the decoding computation remains challenging to run in real-time.

In view of the above there remains a need for improved decoders for use in quantum computing systems.

SUMMARY

There is a need for systems and/or devices with more efficient and effective methods for decoding quantum state information (e.g., correcting erroneous quantum state information). Such systems, devices, and methods optionally complement or replace conventional systems, devices, and methods for decoding quantum state information.

In accordance with some embodiments, a method is performed at a decoder. In some embodiments, the decoder includes memory and one or more processors. The method includes receiving information identifying syndrome values for a plurality of entangled qubit states represented by a syndrome graph with a respective edge of the syndrome graph corresponding to a respective qubit state of the plurality of entangled qubit states, the syndrome graph having at least one boundary with open edges; identifying one or more clusters of qubit states and/or syndrome states in the syndrome graph; repeating the identifying operation until all of the one or more identified clusters are determined to be valid, at least one cluster of the one or more clusters identified at n+1 generation including a corresponding cluster of the one or more clusters identified at n generation and at least a portion of qubit states and/or syndrome states adjacent, in the syndrome graph, to the corresponding cluster of the one or more clusters, including: determining, based on a parity of a respective cluster that is not adjacent to a boundary with open edges, whether the respective cluster is valid; and determining that a respective cluster that is adjacent to a boundary with open edges is valid regardless of a parity of the respective cluster; reconstructing one or more qubit states and/or syndrome states for respective clusters of the one or more identified clusters based on qubit states and/or syndrome states adjacent to the respective clusters of the one or more identified clusters; and storing information identifying the one or more reconstructed qubit states and/or syndrome states.

In accordance with some embodiments, a method is performed at a decoder. In some embodiments, the decoder includes memory and one or more processors. The method includes receiving information identifying syndrome values for a first plurality of entangled qubit states represented by a first syndrome graph with a respective edge of the first syndrome graph corresponding to a respective qubit state of the plurality of entangled qubit states; repeating, for N generations, identifying one or more clusters of qubit states and/or syndrome states in the first syndrome graph until all of the one or more identified clusters are determined to be valid, including increasing a size of a respective cluster each time the identifying operation is performed so that the respective cluster at n+1 generation includes the respective cluster at n generation and at least a portion of qubit states and/or syndrome states adjacent, in the first syndrome graph, to the respective cluster at n generation; combining at least a portion of the information identifying the syndrome values for the first plurality of entangled qubit states and information identifying syndrome values for a second plurality of entangled qubit states that are adjacent to the first plurality of entangled qubit states, at least the portion of the first plurality of entangled qubit states and the second plurality of entangled qubit states being collectively represented by a second syndrome graph, the second syndrome graph including at least a portion of the first boundary within a non-boundary region of the second syndrome graph; repeating identifying one or more clusters of qubit states and/or syndrome states, in the second syndrome graph, until all of the one or more identified clusters are determined to be valid, including identifying, initially, at least a subset of the one or more clusters, in the first syndrome graph, identified at a generation prior to the N generation as at least a subset of the one or more clusters in the second syndrome graph, and increasing a size of a respective cluster each time the identifying operation is performed; reconstructing one or more qubit states and/or syndrome states for a respective cluster of the one or more identified clusters based on qubit states and/or syndrome states adjacent to the respective cluster of the one or more identified clusters; and storing information identifying the one or more reconstructed qubit states and/or syndrome states.

In accordance with some embodiments, a method is performed at a decoder. In some embodiments, the decoder includes memory and one or more processors. The method includes receiving information identifying syndrome values for a plurality of entangled qubit states represented by a syndrome graph with a respective edge of the syndrome graph corresponding to a respective qubit state of the plurality of entangled qubit states; identifying a first set of multiple clusters of qubit states and/or syndrome states in the syndrome graph, the first set of multiple clusters including a first cluster and a second cluster that is distinct and separate from the first cluster; in accordance with a determination that at least one cluster of the first set of multiple clusters is determined to be invalid, identifying a second set of multiple clusters of qubit states and/or syndrome states in the syndrome graph, the second set of multiple clusters including a third cluster and the second cluster, the third cluster including the first cluster and at least a portion of qubit states and/or syndrome states adjacent, in the syndrome graph, to the first cluster; reconstructing one or more qubit states and/or syndrome states for a respective set of multiple clusters that are deemed to be valid based on qubit states and/or syndrome states adjacent to the respective set of multiple clusters that are deemed to be valid; and storing information identifying the one or more reconstructed qubit states and/or syndrome states.

In accordance with some embodiments, a method is performed at a decoder. In some embodiments, the decoder includes memory and one or more processors. The method includes receiving information identifying syndrome values for a plurality of entangled qubit states represented by a syndrome graph with a respective edge of the syndrome graph corresponding to a respective qubit state of the plurality of entangled qubit states; identifying a first set of multiple clusters of qubit states and/or syndrome states in the syndrome graph, the first set of multiple clusters including a first cluster and a second cluster that is distinct and separate from the first cluster; in accordance with a determination that at least one cluster of the first set of multiple clusters is determined to be invalid, identifying a second set of multiple clusters of qubit states and/or syndrome states in the syndrome graph, including: selecting a third cluster that includes the first cluster and one or more qubit states and/or syndrome states adjacent, in the syndrome graph, to the first cluster; selecting a fourth cluster that includes the second cluster and one or more qubit states and/or syndrome states adjacent, in the syndrome graph, to the second cluster; determining whether the third cluster and the fourth cluster have one or more connecting qubit states and/or syndrome states in the syndrome graph; and in accordance with a determination that the third cluster and the fourth cluster have one or more connecting qubit states and/or syndrome states in the syndrome graph, merging (i) at least a subset of the first cluster, (ii) at least a subset of the second cluster, and (iii) the one or more connecting qubit states and/or syndrome states to form a merged cluster; reconstructing one or more qubit states and/or syndrome states for the merged cluster based on the qubit states and/or syndrome states adjacent to the merged cluster; and storing information identifying the one or more reconstructed qubit states and/or syndrome states.

In accordance with some embodiments, an electronic decoder includes one or more processors; and memory storing one or more programs for execution by the one or more processors, the one or more programs including instructions for performing any method described herein. In accordance with some embodiments, a computer readable storage medium stores one or more programs, the one or more programs including instructions, which, when executed by a decoder having one or more processors and memory, cause the decoder to perform any method described herein.

Thus, devices and systems are provided with novel methods for decoding quantum state information, thereby increasing the speed, effectiveness, efficiency, accuracy, and precision of such systems and devices.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIGS. 5A-5I are schematic diagrams illustrating decoding operations in accordance with some embodiments.

FIG. 7 is a flowchart representing a method of decoding quantum state information, in accordance with some embodiments.

FIG. 8 is a flowchart representing a method of decoding quantum state information, in accordance with some embodiments.

FIG. 9 is a flowchart representing a method of decoding quantum state information, in accordance with some embodiments.

Like reference numerals refer to corresponding parts throughout the several views of the drawings.

DETAILED DESCRIPTION

Figure 1:
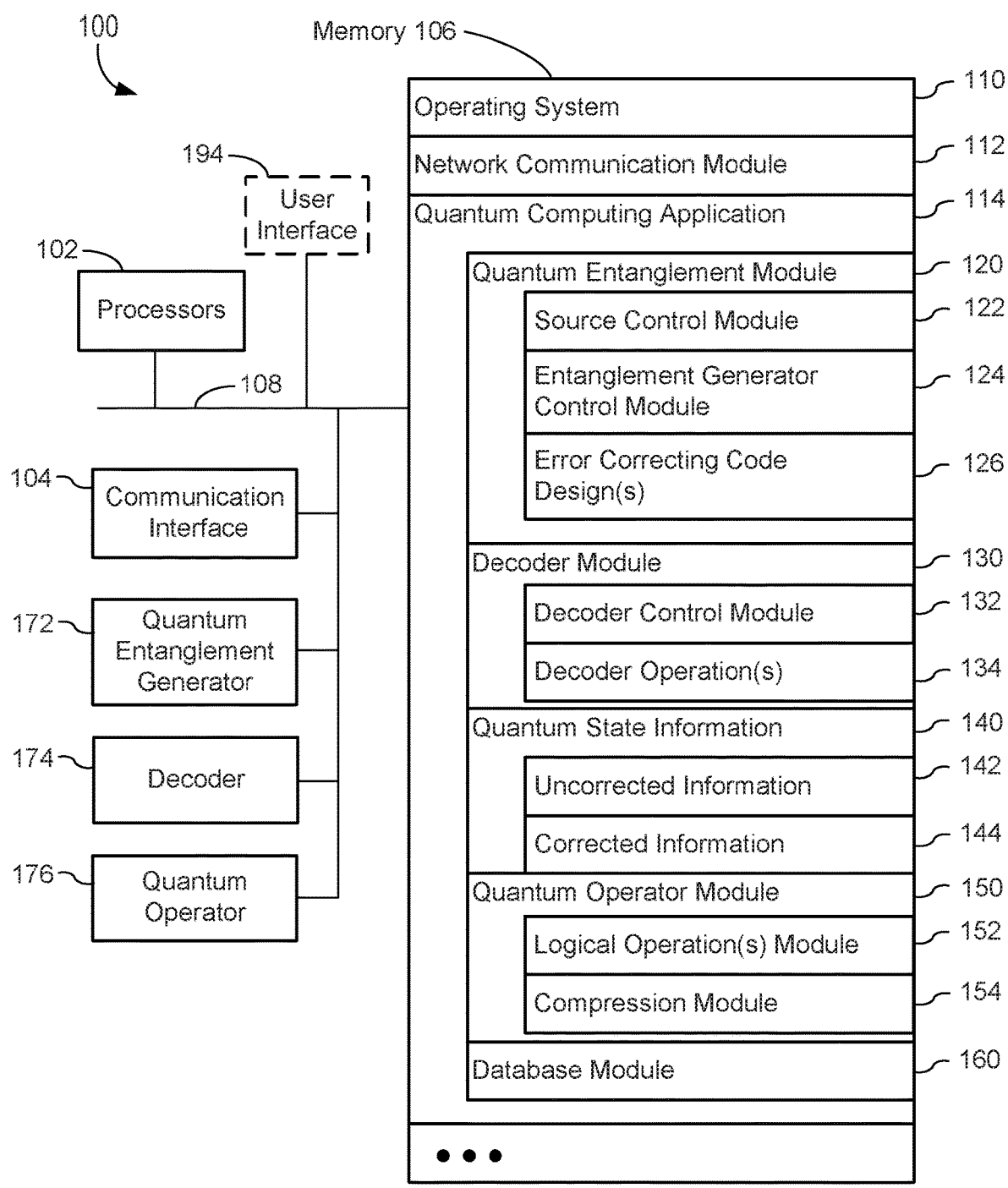
FIG. 1 is a block diagram illustrating components of a quantum computer in accordance with some embodiments.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

In accordance with one or more embodiments, methods and devices for decoding quantum states includes an efficient decoder, referred to herein as the Union-Find decoder, for efficiently decoding quantum bits, also referred to herein qubits, encoded within a quantum error correcting code, where the qubits making up the code are subject to both Pauli error and erasure error. Examples of quantum error correcting codes include the surface code, the color code, or any other topological code for qubits.

In accordance with one or more embodiments, a Union-Find decoder can run in almost linear time while preserving a good performance with respect to error tolerance. For example, one or more embodiments of the Union-Find decoder can efficiently decode a cluster state with an error threshold of approximately 9-10% under pure Pauli error, i.e., the Union-Find decoder can accurately correct for qubit errors in a cluster state having nearly one out of every 10 qubits affected by a Pauli error. When extended to an error model where stabilizer measurements can also fail, the Union-Find decoder possesses an error threshold of 2.6%, under a phenomenological error model.

As used herein the term "almost linear" includes a complexity that scales slower than n log n. For example, the Union-Find decoder has a worst-case complexity $O(n\alpha(n))$, where $\alpha$ is the inverse of Ackermann's function. Although it is not formally linear, $\alpha$ is so slowly growing that if the number of physical qubits used for the cluster state is smaller than the number of atoms in the universe, $\alpha(n)$ has a value less than or equal to 5

As described in further detail below, the Union-Find decoder takes as input a syndrome and transforms it to another syndrome that is compatible with being caused by a known erasure, to which a linear-time erasure decoder can then be applied to return a correction. As used herein, the term "syndrome" and/or syndrome state refers to a set of classical information (e.g. data represented by digital data in the form of ones and zeros) that results when a series of measurements (e.g. stabilizer measurements) are applied to the physical qubits of the cluster state that makes up the encoded logical qubit. As described in further detail below, these measurement outcomes are represented by classical data and, based on the knowledge of the particular geometry of the cluster state/error correcting code, can be used to determine a classical data structure referred to herein as a "syndrome graph." The Union-Find decoder takes, as input, this syndrome graph and also takes as input other classical data points that account for qubit erasures and process this data to produce an estimate of the correction required to correct the measurement outcomes before they are processed by the quantum computer to determine the logical qubit value.

Advantageously, the Union-Find decoder is more robust than a bare erasure decoder because a bare erasure decoder can only provide an optimal linear-time algorithm for decoding the cluster state in the presence of erasure error only; i.e., if any stochastic physical error or measurement error is present, the erasure decoder algorithm fails. To the contrary, as described in more detail below, one or more embodiments of the Union-Find decoder makes use of the Union-Find algorithm to efficiency transform a syndrome with stochastic error, into a syndrome that is compatible with erasure-only error, so it can then be decoded using the erasure decoder.

FIG. 1 is a block diagram illustrating components (e.g., electronic components, optical components, etc.) of quantum computer 100 in accordance with some embodiments. Quantum computer 100 typically includes one or more processing units 102 (central processing units, application processing units, application-specific integrated circuit, etc., which are also called herein processors), one or more network or other communications interfaces 104, memory 106, and one or more communication buses 108 for interconnecting these components. In some embodiments, communication buses 108 include circuitry (sometimes called a chipset) that interconnects and controls communications between system components. In some embodiments, quantum computer 100 includes user interface 194 (e.g., a user interface having a display device, which can be used for displaying acquired images, one or more buttons, and/or other input devices).

In some embodiments, quantum computer 100 also includes quantum entanglement generator 172 configured for generating entangled qubits. For example, in some embodiments, quantum entanglement generator 172 can produce a cluster state that serves as an error correcting code for a logical qubit. In some embodiments, quantum entanglement generator 172 includes one or more quantum bit (also called herein qubit) sources (e.g., one or more single photon sources, one or more trapped ion sources, etc.). In some embodiments, quantum entanglement generator 172 also includes one or more entanglement generators to entangle qubits provided by the one or more qubit sources. In some embodiments, entanglement generators can include a system of linear optical components such as beam splitters, waveguides, interferometers, switches, multiplexors, photon detectors, optical filters, delay lines and the like. However, one of ordinary skill in the art having the benefit of this disclosure will recognize that the union-find decoder described herein can be employed in any quantum computing architecture that employs any type of qubit and is not limited to photonic qubits.

In some embodiments, quantum computer 100 includes decoder 174 configured for correcting errors in quantum state information, the structure and operations of which are described further below.

In some embodiments, quantum entanglement generator 172 also includes one or more detectors for obtaining certain quantum state information (e.g., syndrome states and/or qubit states) from the entangled qubits. In some embodiments, the one or more detectors are configured for obtaining only a subset of quantum state information. In some embodiments, decoder 174 includes the one or more detectors.

In some embodiments, quantum computer 100 includes quantum operator 176 for processing entangled qubits. In some embodiments, quantum operator 176 includes photonic circuits (e.g., integrated optical circuits), electrical circuits, and/or magnetic circuits for processing the entangled qubits. In some embodiments, quantum operator 176 is configured to perform logical operations (e.g., logic gate operations, such as AND, OR, NOT, XOR, NAND, NOR, and/or any combination thereof) with the entangled qubits. In some embodiments, quantum operator 176 is configured to perform compression of the entangled qubits (e.g., determine a sum or a product of qubit states for the entangled qubits).

In some embodiments, communications interfaces 104 include wired communications interfaces and/or wireless communications interfaces (e.g., Wi-Fi, Bluetooth, etc.).

Memory 106 of quantum computer 100 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 106 may optionally include one or more storage devices remotely located from the processors 102. Memory 106, or alternately the non-volatile memory device(s) within memory 106, comprises a computer readable storage medium (which includes a non-transitory computer readable storage medium and/or a transitory computer readable storage medium). In some embodiments, memory 106 includes a removable storage device (e.g., Secure Digital memory card, Universal Serial Bus memory device, etc.). In some embodiments, memory 106 is a physically separate and distinct storage device (e.g., a memory chip). In some embodiments, memory 106 is integrated in another electronic component (e.g., cache and/or register of a processor).

In some embodiments, memory 106 or the computer readable storage medium of memory 106 stores the following programs, modules and data structures, or a subset thereof:

- operating system 110 that includes procedures for handling various basic system services and for performing hardware dependent tasks;
- network communication module (or instructions) 112 that is used for connecting quantum computer 100 to other computers (e.g., clients and/or servers) via one or more communications interfaces 104 and one or more communications networks, such as the Internet, other wide area networks, local area networks, metropolitan area networks, and so on; and
- quantum computing application 114 that controls operations of quantum entanglement generator 172, decoder 174, and/or quantum operator 176.

In some embodiments, quantum computing application 114 includes the following modules and data structures, or a subset or superset thereof:

- quantum entanglement module 120 configured for operating quantum entanglement generator 172;
- decoder module 130 configured for operating decoder 174;
- quantum state information 140 storing various quantum state information, such as qubit states and/or syndrome states for a respective set of entangled qubits;
- quantum operator module 150 configured for operating quantum operator 176; and
- database module 160 configured to assist storage and/or retrieval of data on quantum computer 100 or a remote data storage device (e.g., a remote data server).

In some embodiments, quantum entanglement module 120 includes the following programs, modules and data structures, or a subset or superset thereof:

- source control module 122 configured for controlling one or more qubit sources in quantum entanglement generator 172 (e.g., providing instructions to the one or more qubit sources to provide a certain number of qubits);
- entanglement generator control module 124 configured for controlling the one or more entanglement generators (e.g., providing instructions to the one or more entanglement generators to entangle certain groups of qubits); and
- error correcting code design(s) 126 (e.g., information identifying how a group of qubits needs to be entangled, such as Shor code, Steane code, CSS codes, stabilizer codes, topological quantum codes, etc.).

In some embodiments, decoder module 130 includes the following programs, modules and data structures, or a subset or superset thereof:

- decoder control module 132 configured for controlling decoder 174 (e.g., providing instructions to decoder 174 to initiate correction of errors in quantum state information, e.g., as determined through the Union-Find decoding process described in more detail below); and
- decoder operations 134 including information identifying particular decoder operations (e.g., cluster identification, selective growth of a cluster, etc.). In some embodiments, decoder operations 134 also include instructions for transferring data between decoder 174 and other components (e.g., quantum entanglement generator 172 and/or quantum operator 176).

In some embodiments, quantum state information 140 includes the following data structures, or a subset or superset thereof:

- uncorrected information 142 obtained from quantum state measurements; and
- corrected information 144 obtained by processing uncorrected information 142 with decoder 174.

In some embodiments, quantum state information 140 includes multiple copies, including one or more interim copies, of corrected information 144 based on a number of iterations of error correction operations.

In some embodiments, quantum state information 140, or a subset or superset thereof, is stored outside memory 106 (e.g., quantum state information 140, or a subset or superset thereof, is stored in decoder 174).

In some embodiments, quantum operator module 150 includes the following programs, modules and data structures, or a subset or superset thereof:

- logical operations module 152 configured for controlling quantum operator 176 for logical operations (e.g., providing instructions to quantum operator 176 to initiate certain logical operations); and
- compression module 154 configured for controlling quantum operator 176 for compression operation (e.g., providing a sum or a product of a group of entangled qubits).

Each of the above identified modules and applications correspond to a set of instructions for performing one or more functions described above. These modules (e.g., sets of instructions) need not be implemented as separate software programs, procedures or modules, and thus various subsets of these modules may be combined or otherwise re-arranged in various embodiments. In some embodiments, memory 106 may store a subset of the modules and data structures identified above. Furthermore, memory 106 may store additional modules and data structures not described above.

The above-described components need not be implemented as separate components, and thus various subsets of these components may be combined or otherwise re-arranged in various embodiments. For example, in some embodiments, quantum entanglement generator 172 and decoder 174 are integrated in a single physical component (e.g., a single integrated photonic circuit).

Figure 2:
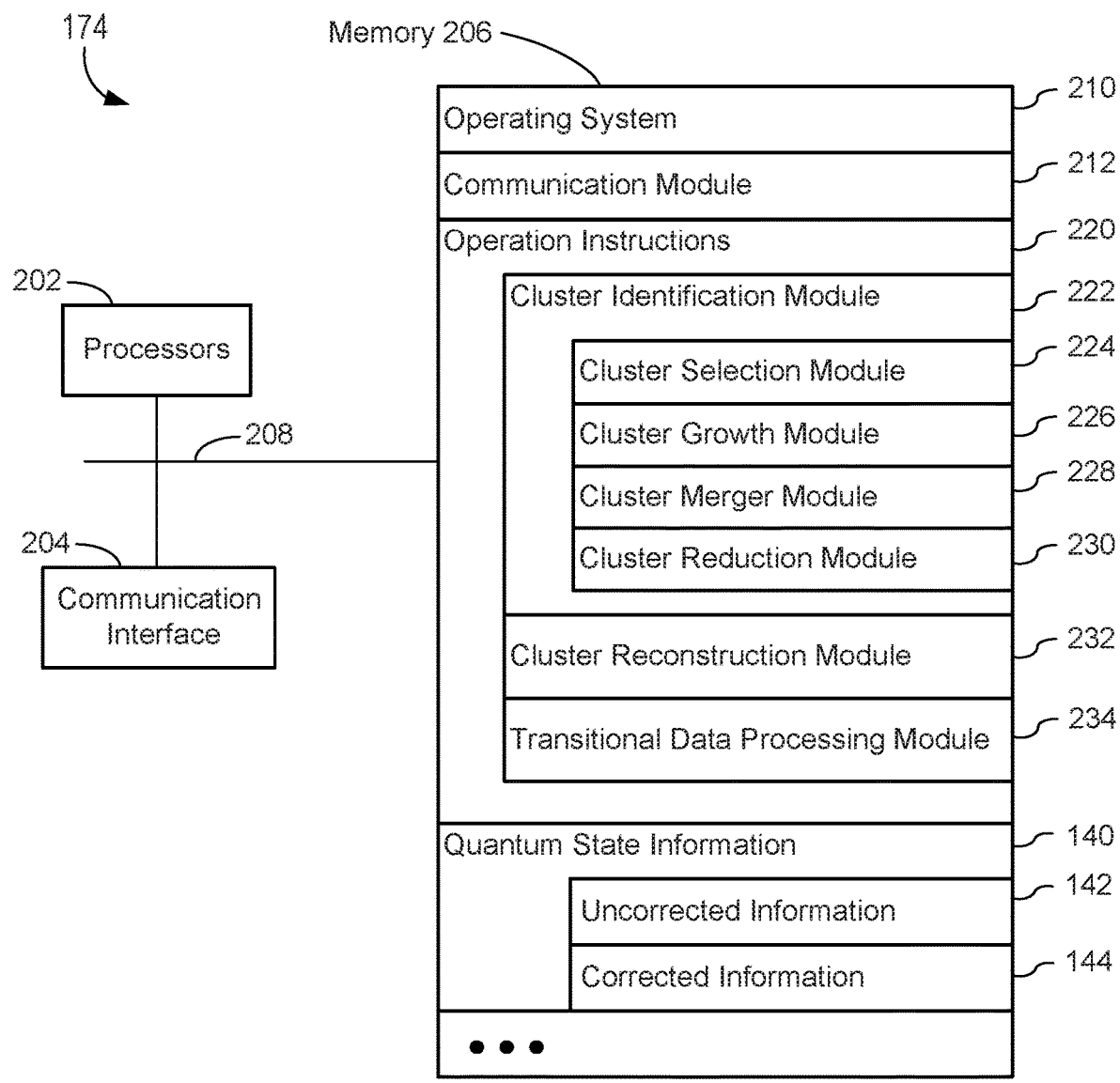
FIG. 2 is a block diagram illustrating components of a decoder in accordance with some embodiments.

FIG. 2 is a block diagram illustrating components (e.g., electronic components) of decoder 174 in accordance with some embodiments.

Decoder 174 typically includes one or more processing units 202 (central processing units, application processing units, application-specific integrated circuit, etc., which are also called herein processors), one or more communications interfaces 204, memory 206, and one or more communication buses 208 for interconnecting these components. In some embodiments, communication buses 208 include circuitry (sometimes called a chipset) that interconnects and controls communications between system components. In some embodiments, communications interfaces 204 include communications interfaces for communicating information (e.g., with other components of quantum computer 100). In some embodiments, decoder 174 is implemented in a single semiconductor chip, such as a field-programmable gate array (FPGA) (e.g., decoder 174 comprises a field-programmable gate array) or an application-specific integrated circuit (ASIC) (e.g., decoder 174 comprises an application-specific integrated circuit). In some embodiments, decoder 174 is implemented using one or more processors 102 and memory 106 of quantum computer 100.

Memory 206 of decoder 174 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processors 202. Memory 206, or alternately the non-volatile memory device(s) within memory 206, comprises a computer readable storage medium (which includes a non-transitory computer readable storage medium and/or a transitory computer readable storage medium). In some embodiments, memory 206 includes a removable storage device (e.g., Secure Digital memory card, Universal Serial Bus memory device, etc.). In some embodiments, memory 206 is a physically separate and distinct storage device (e.g., a memory chip).

In some embodiments, memory 206 or the computer readable storage medium of memory 206 stores the following programs, modules and data structures, or a subset thereof:
  operating system 210 that includes procedures for handling various basic system services and for performing hardware dependent tasks;
  communication module (or instructions) 212 that is used for connecting decoder 174 to other components of quantum computer 100 (e.g., memory 106, quantum entanglement generator 172, and/or quantum operator 176) via one or more communications interfaces 204;
  operating instructions 220 that controls decoding operations of decoder 174; and
  quantum state information 140, which is described above with respect to FIG. 1, or a local and/or temporary copy thereof.

In some embodiments, operating instructions 220 include the following programs, modules, or a subset or superset thereof:
  cluster identification module 222 configured for identifying one or more clusters of quantum states and/or syndrome states in a cluster state representing a plurality of entangled quantum states;
  cluster reconstruction module 232 configured for reconstructing one or more identified clusters; and
  transitional data processing module 234 configured for processing transitional data (e.g., a subset of data selected using a sliding window).

In some embodiments, cluster identification module 222 includes the following programs, modules, or a subset or superset thereof:
  cluster selection module 224 configured for selecting one or more clusters (e.g., for selective growth);
  cluster growth module 226 configured for growing one or more clusters (e.g., increasing a size of a respective cluster);
  cluster merger module 228 configured for merging two or more clusters into a single merged cluster; and
  cluster reduction module 230 configured for reducing a size of a cluster (e.g., a merged cluster).

In some embodiments, decoder module 130 includes the following programs, modules and data structures, or a subset or superset thereof:
  decoder control module 132 configured for controlling decoder 174 (e.g., providing instructions to decoder 174 to initiate correction of errors in quantum state information); and
  decoder operations 134 including information identifying particular decoder operations (e.g., cluster identification, selective growth of a cluster, etc.). In some embodiments, decoder operations 134 also include instructions for transferring data between decoder 174 and other components (e.g., quantum entanglement generator 172 and/or quantum operator 176).

In some embodiments, quantum state information 140 includes the following data structures, or a subset or superset thereof:
  uncorrected information 142 obtained from quantum state measurements; and
  corrected information 144 obtained by processing uncorrected information 142 with decoder 174.

Each of the above identified modules correspond to a set of instructions for performing one or more functions described above. These modules (e.g., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Figure 3:
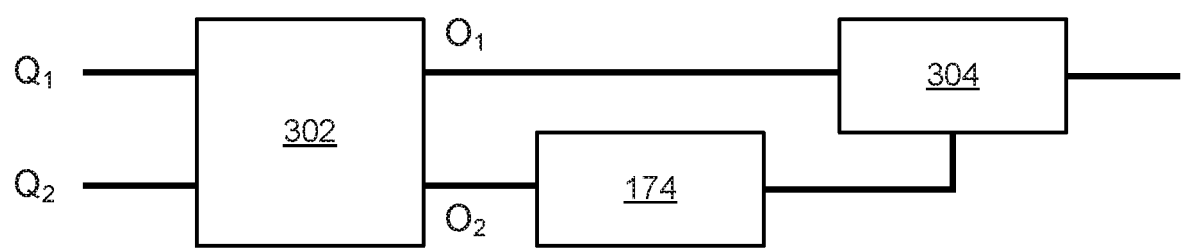
FIG. 3 is a block diagram illustrating a section of a quantum computer that includes a decoder in accordance with some embodiments.

FIG. 3 is a block diagram illustrating a section of a quantum computer that includes a decoder in accordance with some embodiments. In FIG. 3, gate 302 receives two logical qubits, Q1 and Q2, and can perform a logical operation on one of or both logical qubits. As described in further detail below, each logical qubit Q1 and Q2 can be encoded within an error correcting code (such as a cluster state) and therefore can be formed from a group of entangled physical qubits. Due to one or more errors in the physical qubits that make up the code and/or due to errors induced by the action of the logical gate on one or more physical qubits of the code, the output qubits O1 and O2 from gate 302 frequently contain errors, which may need correction. In one example a decoder 174 receives output qubit O2 and performs a collection of measurements (e.g., stabilizer measurements) on the physical qubits that make up the cluster state to determine a syndrome state of the logical qubit. Based on the (now classical) information contained in the syndrome graph state, the decoder 174 can perform error correction to determine one or more corrections to be applied to the measured data in order to properly decode the logical value of the measured qubit Q2. In addition, optionally the error correction information can be passed to a quantum logic gate 304 and can be used to apply a correction to the output qubit O1. While FIG. 3 shows an example of the decoder being used to both correct classical information (the results of the initial measurements of the physical qubits making up logical qubit Q2) and top correct quantum information (the logical gate 304 being applied to output qubit O1) only one of these operations can be implemented alone in any given implementation of the decoder. In addition, the initial set of measurements made at decoder 174 in this example can be performed anywhere in the quantum circuit and need not be performed at the decoder. For example, in some embodiments, a single logical qubit (encoded as a cluster state formed from many physical qubits) can be incident on one or more measurement devices, e.g., photon detectors, and the set of measurement results (now classical information) can be stored in memory or passed to the decoder for later processing. For example, the syndrome graph state of the multi-qubit error correcting code can be measured and passed to a decoder for decoding using the Union-Find decoder. The correction determined by the Union-Find decoder can be used to correct one or more of the classical bits that were obtained by the measurement device before that classical data is used to determine the logical state of the logical qubit.

In some embodiments, the speed of decoder 174 is critical. If a decoder is slow, gate 304 needs to delay processing of output O1 until the information from the decoder becomes available so that the gate 304 can perform the proper correction operation based on the output of the decoder 174. During the delay, additional errors can impact output O1 (e.g., one or more qubits are lost, etc.). Thus, improving the speed of decoder 174 can improve the accuracy, reliability, and operability of quantum computers. Furthermore, even in situations where the output of decoder 174 is not needed to drive the gate 304, it may be used for other purposes. For example, in the case of measurement based quantum computing, the logical outcomes of prior measured logical qubits can determine the type of measurement that needs to be made on some other later-measured qubit as a quantum computation is executed. As such, of overall speed of the quantum computation can be limited by the time it takes to classically decode the cluster state measurement outcomes.

Figure 4A:
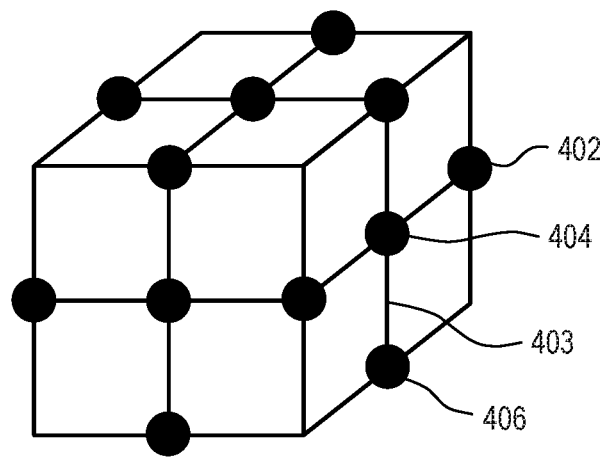
FIGS. 4A-4D are schematic diagrams illustrating a cluster state and corresponding syndrome graph for an entangled state of physical qubits in accordance with some embodiments.
Figure 4B:
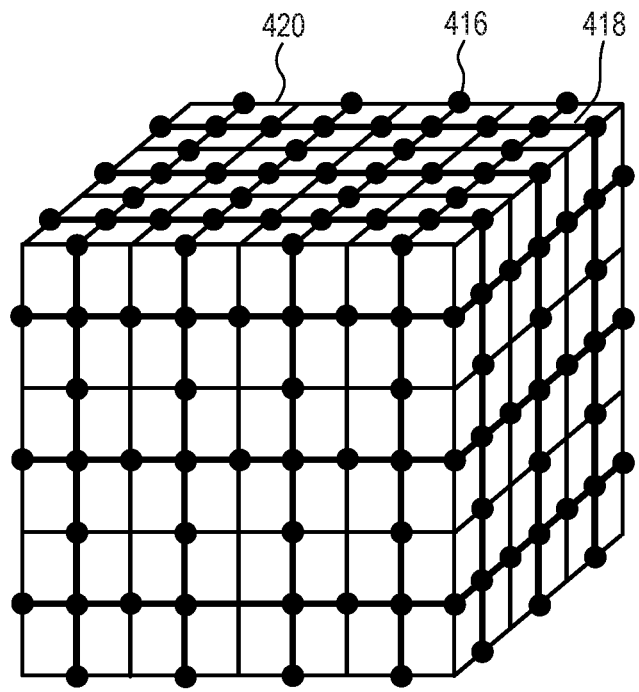
Figures 2, 4B:
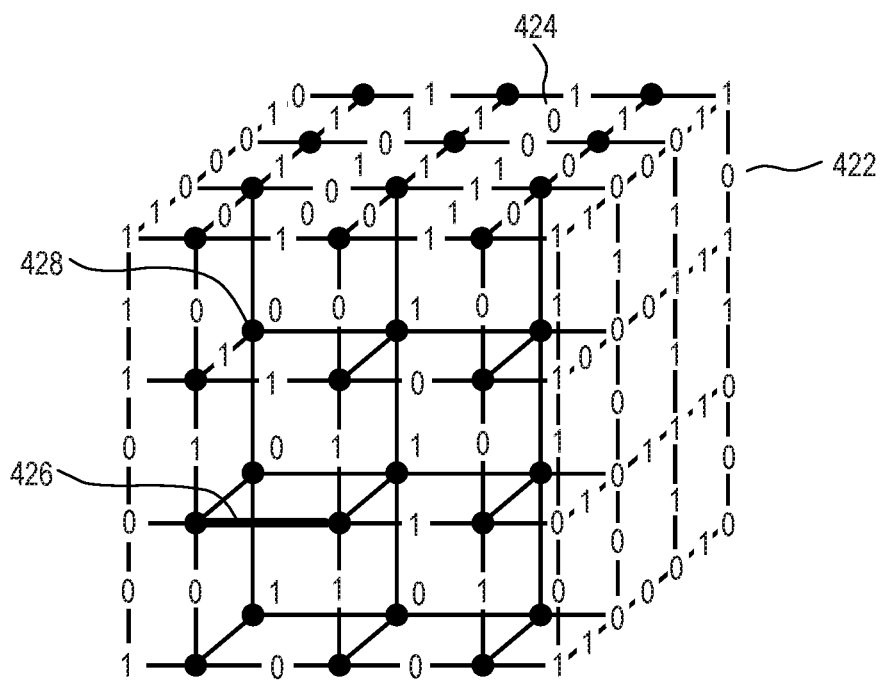
Figures 3, 4B:
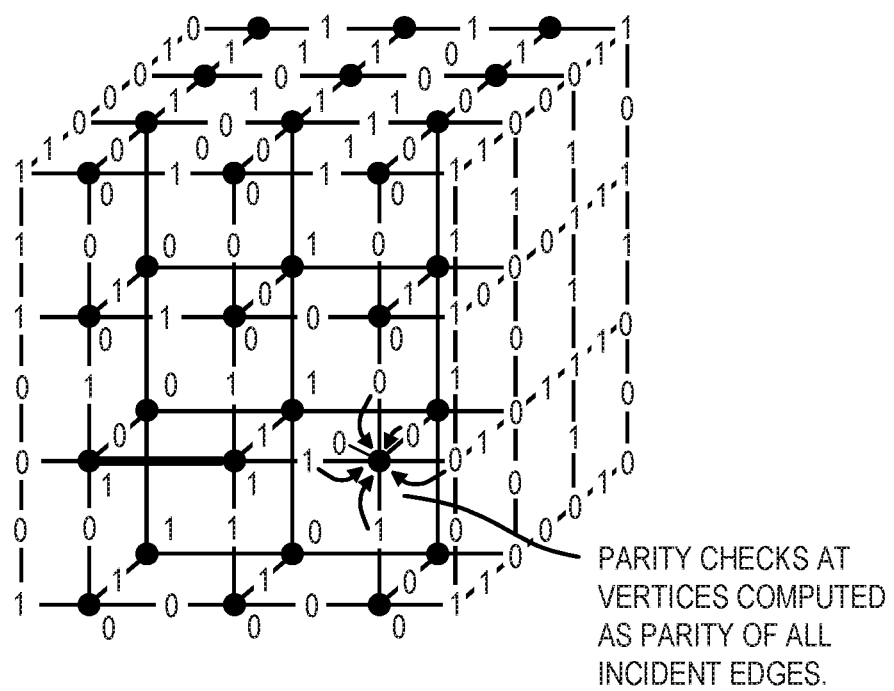
Figure 4C:
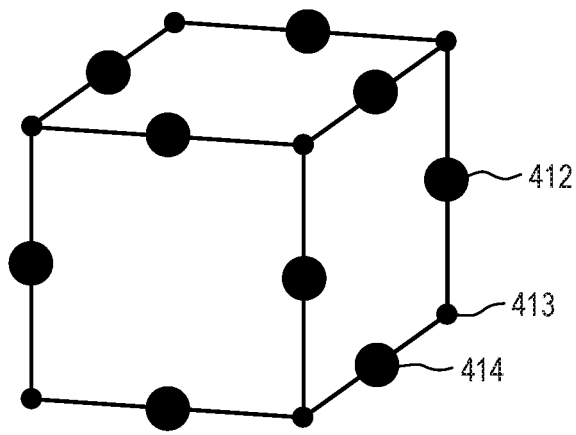
Figure 4D:
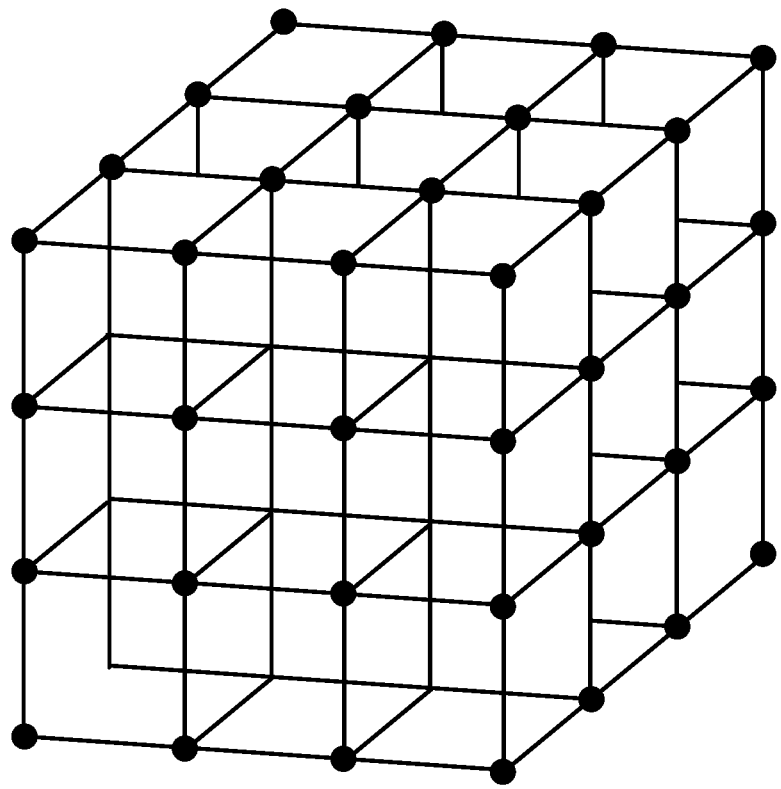

FIGS. 4A-4B are schematic diagrams illustrating cluster states and FIGS. 4C-4D illustrate their corresponding syndrome graphs representing entangled qubit states in accordance with some embodiments. Qubits arranged in such a cluster state, or in an error correcting code corresponding to such a syndrome graph, can be useful for correcting errors in logical qubits. In particular, as introduced above, a single logical qubit can be encoded using multiple entangled physical qubits, with their entanglements arranged in a cluster state like those shown in FIGS. 4A-4D. The multiple physical qubits can be used for correcting errors in some of the physical qubits through the use of a decoder such as the Union-Find decoder. However, as noted above, a large number of qubits requires more (classical) processing power for error correction. In particular, many conventional error correction methods have high-order complexity (e.g., quadratic complexity), and thus, the error correction slows down significantly with the increasing number of qubits in the error correcting code (i.e., in the cluster state). The particular geometry of syndrome graph shown in FIGS. 4A-4D is chosen merely for the sake of illustration and the Union-Find decoder can decode topological codes corresponding to syndrome graphs having any geometry without departing from the scope of the present disclosure.

FIG. 4A is a schematic diagram illustrating a block representing entangled qubit states in accordance with some embodiments. In FIG. 4A, each node (e.g., node 402) represents a qubit, and bond 403 between two nodes 404 and 406 represents entanglement between two qubits represented by the two nodes (bond 403 between nodes 404 and 406 represents entanglement between two qubits represented by nodes 404 and 406).

FIG. 4B represents a large cluster state that may encode a logical qubit. Each node, e.g., node 416, represents a qubit and each, e.g., edge 418, edge represents an entangling bond. The geometry of the cluster state graph is related to the geometry of a cubic lattice 420, shown superimposed. This cubic lattice structure is also referred to herein as the syndrome graph, which represents the relationship of the classical data (qubit measurement outcomes in the form of a classical data structure) obtained from measurements made on the qubits of the cluster state. The same data structure relating measurement outcomes may also be obtained from other implementations of topological codes that are not based on an entangled cluster state, such as a 2+1D surface code implementation.

In some embodiments, a measured qubit state is represented by a numerical bit value of either 1 or 0. FIG. 4B-2 shows the cluster state of FIG. 4B after all qubits have been measured. There are two types of qubits, those that are located on the edges of the syndrome graph (e.g. at edge 422), and those that are located on the faces of the syndrome graph (e.g., face 424). In some cases, a measurement of the qubit may not be obtained, or the result of the qubit measurement may be invalid. In these cases, in the syndrome graph there is no bit value assigned to the location of the corresponding measured qubit, but instead the outcome is an erasure, illustrated here as thick line 426, for example. These measurement outcomes that are known to be missing can be reconstructed during the decoding procedure.

The bit values associated with each edge of the syndrome graph shown can be combined to create the syndrome values that can be stored at the vertices of the syndrome graph, e.g., vertex 428 shown in FIG. 4B-2. These syndrome values, also referred to herein as parity checks, are associated with each vertex of the syndrome graph, as shown in FIG. 4B-3. More specifically, in FIG. 4B-3, the computed values of some of the vertex parity checks of the syndrome graph are shown. The parity check values can be found by computing the parity of the bit values associated with each edge of the syndrome graph incident to the vertex. In some embodiments, a parity computation entails determining whether the sum of the edge but values is an even or odd integer, with the parity result being the result of the sum mod 2. If no errors occurred in the quantum state, or in the qubit measurement then all syndrome values should be even (or 0). If an error occurs it may result in some odd (or 1) syndrome values. Only half of the bit values from qubit measurement are associated with the syndrome graph shown (the bits aligned with the edges of the syndrome graph). There is another (dual) syndrome graph that contains all the bit values associated with the faces of the lattice shown. This leads to an equivalent decoding problem on these bits.

FIG. 4C is a syndrome graph with parity check values removed for clarity in accordance with some embodiments. As before, in FIG. 4C, an edge (e.g., edge 412 or 414) of the syndrome graph represents a position in the data structure where a measurement outcome from a qubit in the original entangled state is stored. A vertex (e.g., vertex 413) of the cluster state represents the results of a syndrome measurement. In some embodiments, a syndrome has a state that reflects qubit states immediately adjacent to the syndrome. In some cases, a syndrome has a value that is a sum of measured qubit states on edges directly extending from the syndrome. In some cases, when the syndrome has an odd value, the syndrome state is represented by a value of 1, and when the syndrome has an even value, the syndrome state is represented by a value of 0. FIG. 4D shows a syndrome graph representing syndromes for a large number of entangled qubits.

FIGS. 5A-5I are schematic diagrams illustrating decoding operations in accordance with some embodiments. For the sake of clarity, FIGS. 5A-5I show syndrome graphs that would result from a quantum error correcting code having a two-dimensional lattice geometry, often referred to as the "surface code." Such a code can be used in a stand-alone manner to encode a logical qubit within a surface entanglement geometry or can also be thought of as the individual layers of a more complex three-dimensional cluster state, or even as a two-dimensional layer of a more complex dynamic geometry that generates planar slices of a three-dimensional code over time, the co-called 2D+1 (time) architecture.

Figure 5A:
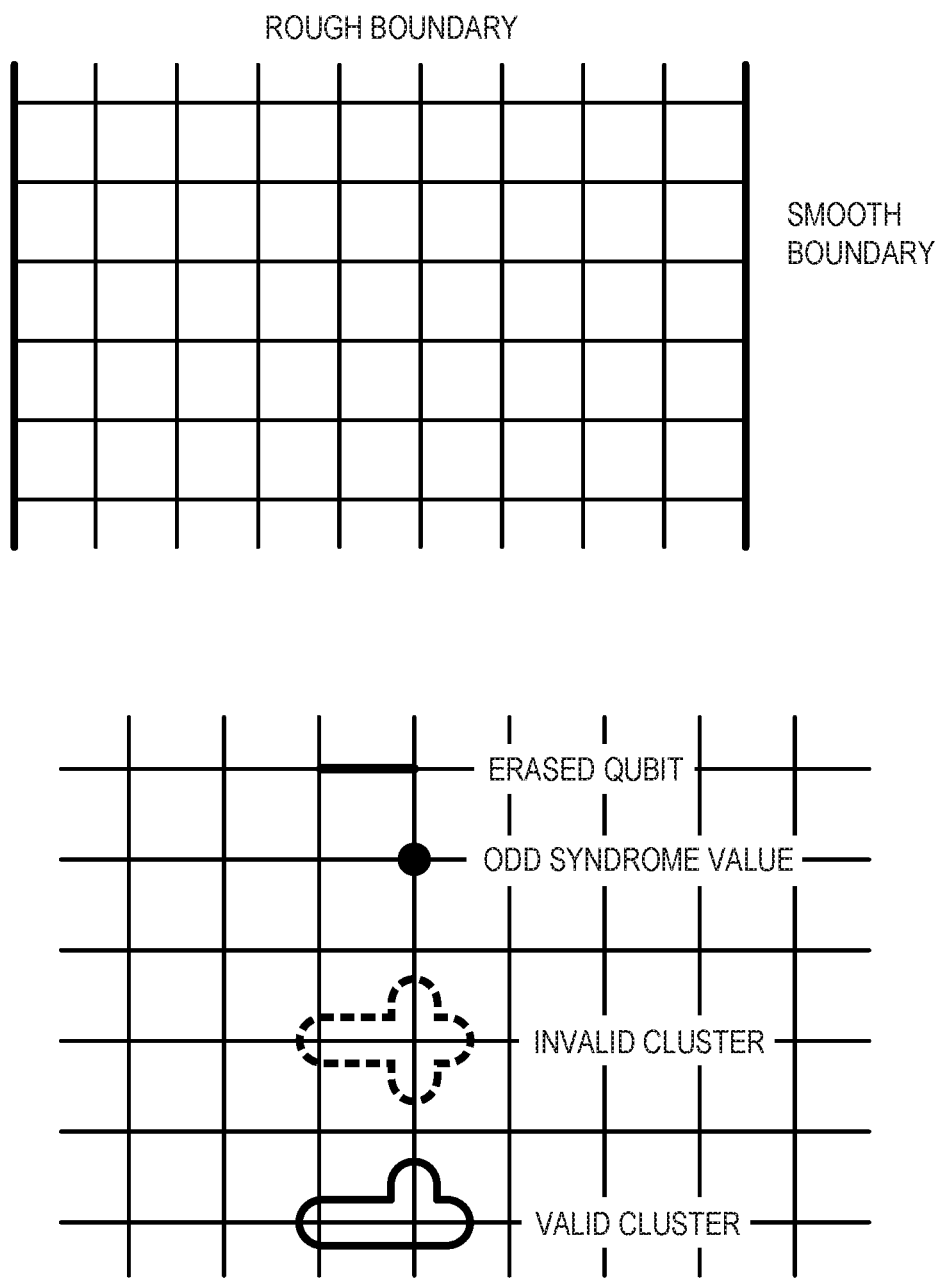

FIG. 5A illustrates graphical notations used in syndrome graph diagrams in accordance with one or more embodiments. Although high-dimensional syndrome graphs (e.g., a three-dimensional syndrome graph as shown in FIG. 4D, a four-dimensional graph, a five-dimensional graph, or a lattice having a higher dimension) can be used, for brevity, two-dimensional lattices are used throughout this application to illustrate certain aspects. However, a person having ordinary skill in the art would understand that the described methods and devices can be used with lattices of higher dimensions in an analogous manner. Similarly, the structure of the syndrome graph represented here is that of a square lattice, or cubic lattice for clarity, but any geometry of syndrome graph can be treated in the same manner.

The syndrome graphs shown in FIGS. 5A-5I correspond to visual representations of classical data that can result from a collection of syndrome measurements that are applied to a collection of physical qubits that are entangled according to the surface code geometry. In these examples, the classical data that results from different types of measurement is represented graphically, with a geometry that is related to the geometry of the original entangled state, e.g., a respective edge of the syndrome graph corresponds to a qubit state and a respective vertex corresponds to a syndrome.

As shown in FIG. 5A, many examples are described with respect to a syndrome graph having one or more smooth boundaries and one or more rough boundaries (e.g., two smooth boundaries and two rough boundaries). However, the described methods and devices can be used with graphs having any other numbers of rough boundaries and/or any other numbers of smooth boundaries. As used herein, a rough boundary refers to a boundary with open edges only (e.g., a boundary that is defined solely by one or more qubit states (with states corresponding to "0", "1" or "erased") a rough boundary does not include syndrome measurement results (herein referred to as "syndromes") on the boundary). Classical information referring to a particular qubit state on a rough boundary is typically connected (directly) to a single syndrome. As used herein, a smooth boundary refers to a boundary with no open edges (e.g., the boundary is defined by vertices on the syndrome graph). An edge that is not open is also referred to herein as a closed edge. A qubit state (i.e., an edge on the syndrome graph) on a smooth boundary is typically connected (directly) to two or more syndromes.

Also shown in FIG. 5A are graphical notations for the classical data elements that represent erased qubits, odd syndrome values (e.g., a syndrome having an odd value), an invalid cluster (e.g., a cluster with an odd number of syndromes having odd values), and a valid cluster (e.g., a cluster with an even number of syndromes having odd values) in the syndrome graph. A valid cluster is a cluster for which a reconstruction operation can be performed (for error correction). An invalid cluster is a cluster for which a reconstruction operation cannot be performed. In general, whether a cluster is valid or invalid is independent of whether the cluster contains an error or not.

Figure 5B:
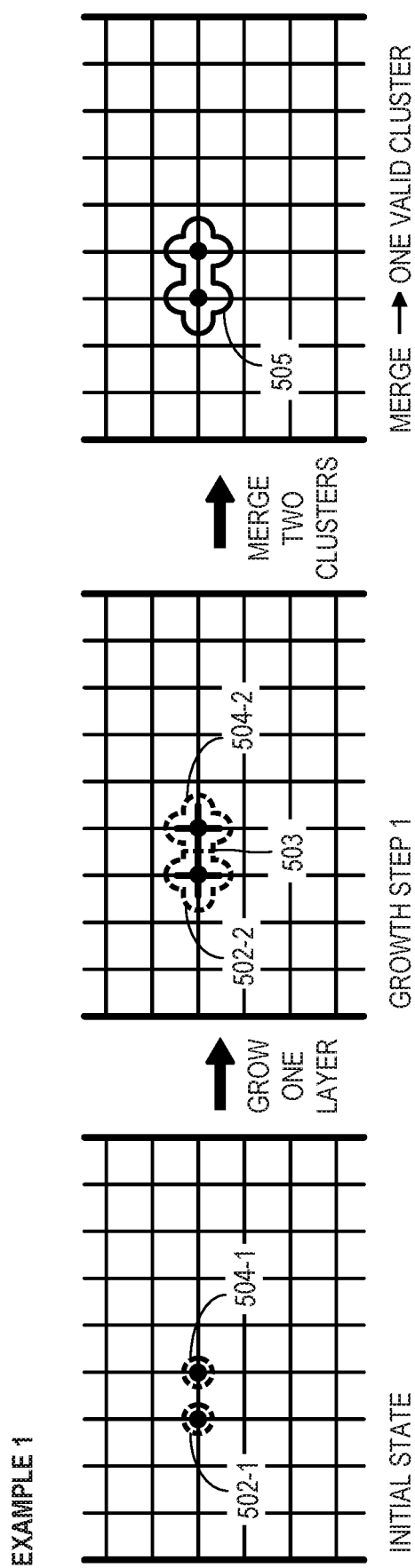

FIG. 5B illustrates operations for correcting errors in accordance with some embodiments. In some embodiments, whether all of the errors in a lattice (representing quantum states of a plurality of entangled qubits) have been corrected is determined based on whether the lattice contains any syndrome having an odd value.

In FIG. 5B, the decoder determines that the lattice contains two syndromes having odd values (e.g., Pauli errors). The decoder identifies each syndrome as a cluster (having a single syndrome) (e.g., the lattice contains clusters 502-1 and clusters 504-1, each having a single syndrome having an odd value).

Subsequently, the decoder increases a size of each cluster by including, in the cluster, qubit measurement outcomes that extending further from the single syndrome in the cluster (e.g., the lattice contains expanded clusters 502-2 and 504-2).

Thereafter, the decoder determines that the two clusters have a common qubit (e.g., qubit 503) and merges the two clusters (e.g., clusters 502-2 and 504-2) to form a single merged cluster (e.g., cluster 505). Based on a determination that the merged cluster has an even number of syndromes having odd values (e.g., cluster 505 has two syndromes having odd values), the decoder determines that the merged cluster is valid. The valid cluster can be reconstructed to correct for one or more errors included in the valid cluster. In some embodiments, the decoder reconstructs qubit states and/or syndrome states within the valid cluster by applying an Erasure Decoding process, as described in more detail below in reference to FIGS. 6A-6B.

Figure 5C:
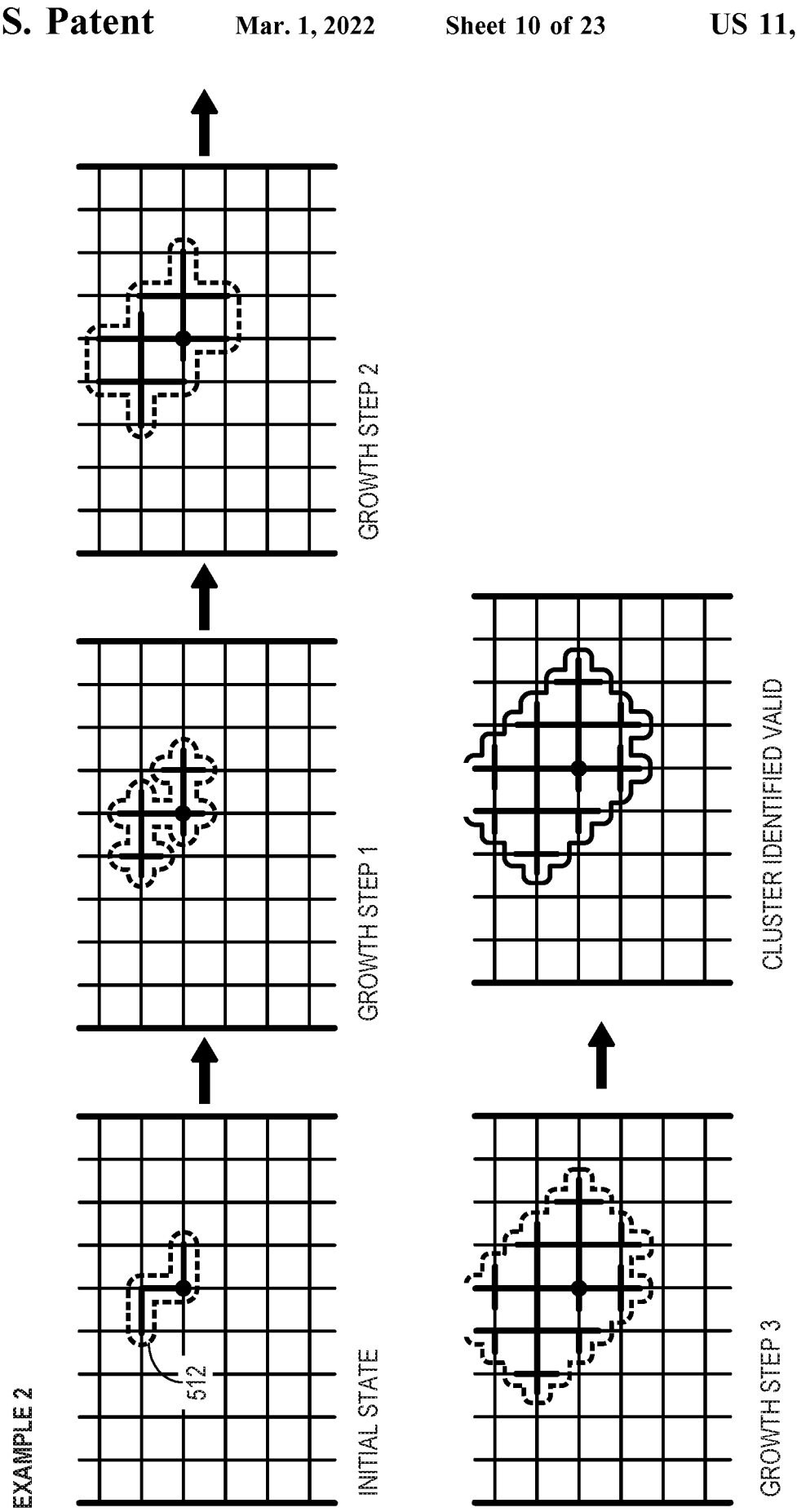

FIG. 5C illustrates operations for correcting errors in accordance with some embodiments. In FIG. 5C, the decoder determines that the lattice contains one syndrome having an odd value and multiple erased qubits (and three syndromes having even values). Because based on the adjacency, the decoder determines that the syndrome having an odd value and the erased qubits are part of a single cluster (e.g., the erased qubits and the syndrome having an odd value are directly connected by edges corresponding to the erased qubits).

Subsequently, the decoder increases the size of the cluster by including, in the cluster, qubits extending from the single syndrome in the cluster (step 1). The decoder repeats this operation (e.g., step 2 and step 3) until the decoder determines that the cluster is adjacent to a rough boundary (e.g., the cluster includes a qubit that corresponds to an open edge in the cluster state). Then, based on a determination that the cluster is adjacent to a rough boundary, the decoder determines that the cluster is valid. The valid cluster can be reconstructed to correct for one or more errors included in the valid cluster. In some embodiments, the decoder reconstructs qubit states and/or syndrome states within the valid cluster.

Figure 5D:
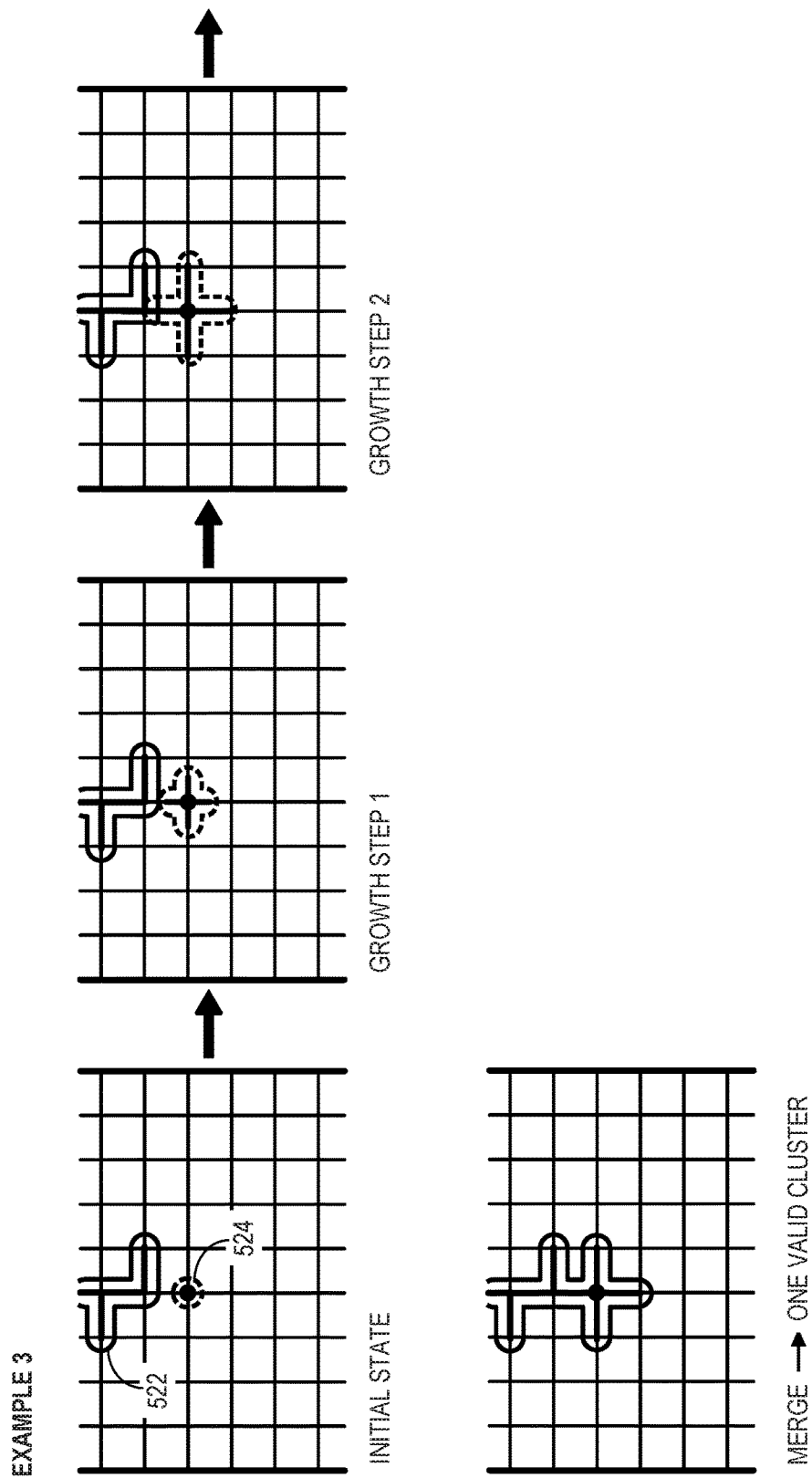

FIG. 5D illustrates operations for correcting errors in accordance with some embodiments. In FIG. 5D, the decoder determines that the lattice contains valid cluster 522 (in some cases, the validity of which is determined based adjacency of cluster 522 to a rough boundary) and invalid cluster 524 with a single syndrome with an odd syndrome value. Subsequently, the decoder increases the size of invalid cluster 524 (e.g., steps 1 and 2) until the decoder determines that clusters 522 and 524 have a common qubit and merges the two clusters 522 and 524 to form a single merged cluster. Based on a determination that the merged cluster is adjacent to a rough boundary, the decoder determines that the merged cluster is valid. The valid cluster can be reconstructed to correct for one or more errors included in the valid cluster. In some embodiments, the decoder reconstructs qubit states and/or syndrome states within the valid cluster.

Figure 5E:
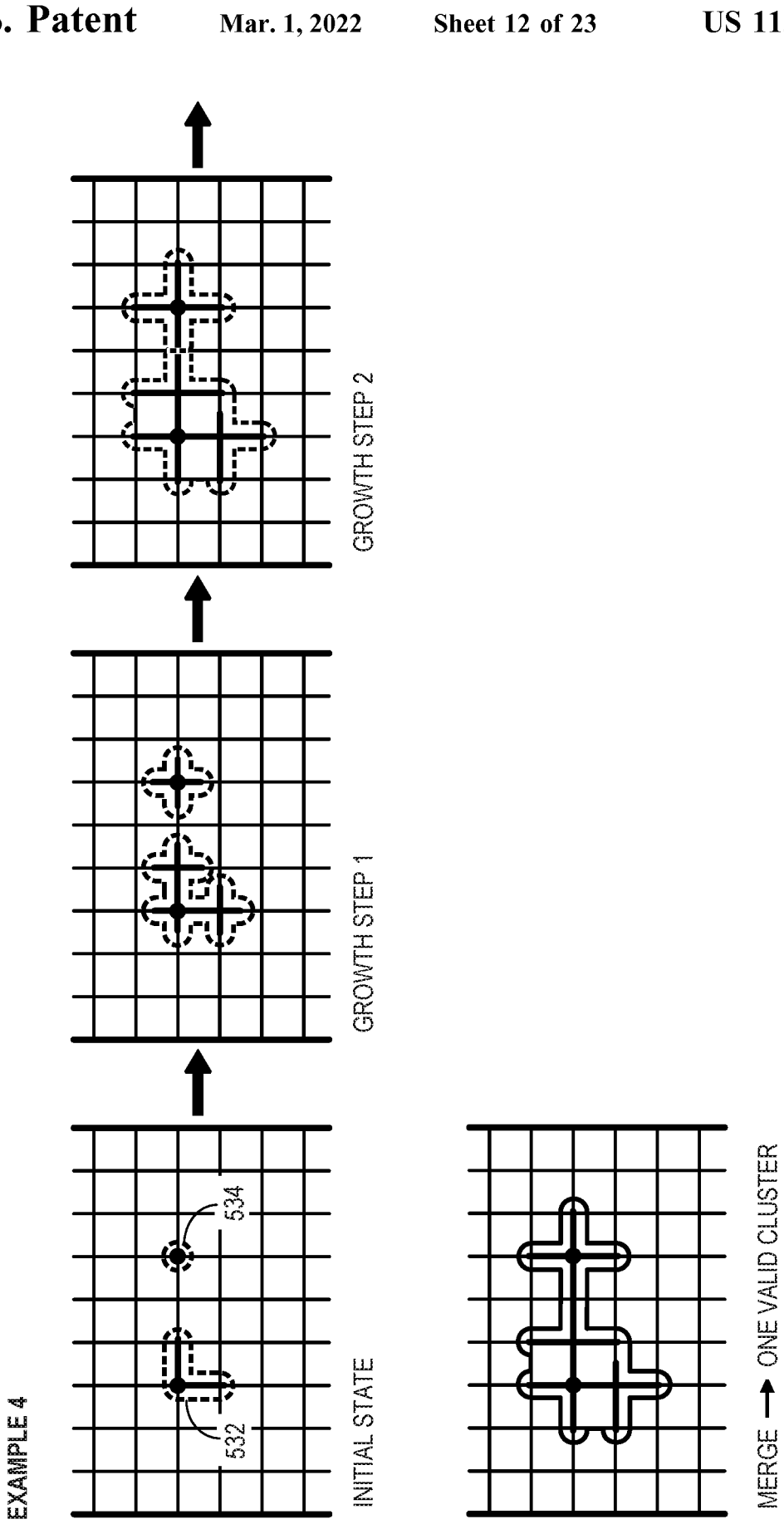

FIG. 5E illustrates operations for correcting errors in accordance with some embodiments. In FIG. 5E, the decoder identifies two invalid clusters 532 and 534. Cluster 532 contains a syndrome with an odd value and two erased qubits (and two syndromes with even values). Cluster 534 contains a single syndrome with an odd value. The decoder increases the size of invalid clusters 532 and 534 (e.g., steps 1 and 2) until the decoder determines that clusters 532 and 534 have a common syndrome and merges the two clusters 532 and 534. Based on a determination that the merged cluster has an even number of syndromes having odd values (e.g., the merged cluster has two syndromes having odd values), the decoder determines that the merged cluster is valid. The valid cluster can be reconstructed to correct for one or more errors included in the valid cluster. In some embodiments, the decoder reconstructs qubit states and/or syndrome states within the valid cluster.

Figure 5F:
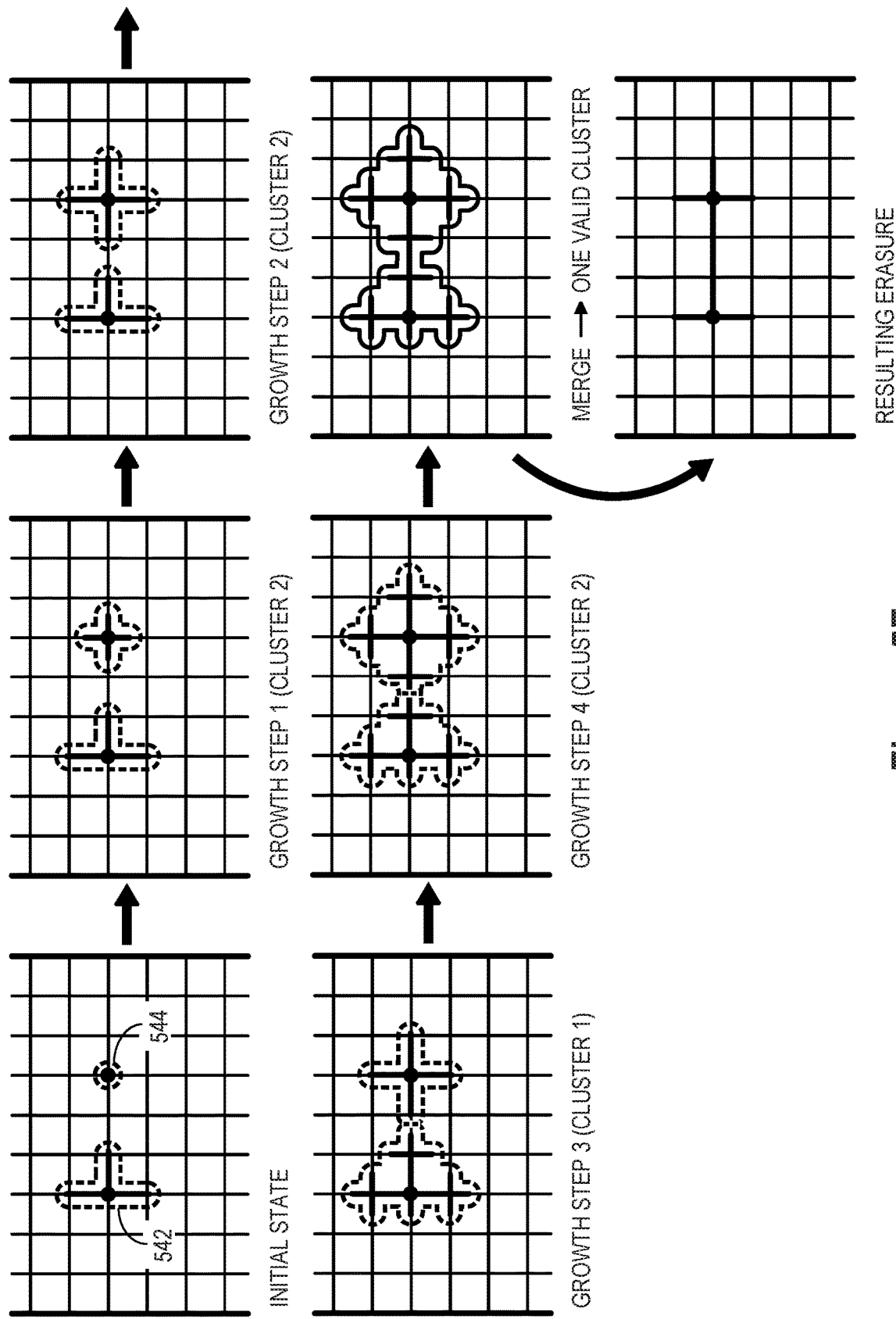

FIG. 5F illustrates selective growth of clusters for error correction in accordance with some embodiments. In FIG. 5F, the decoder identifies two invalid clusters 542 and 544. A first cluster, namely cluster 542, contains a syndrome with an odd value and three erased qubits (and three syndromes with even values). A second cluster, namely cluster 544, contains a single syndrome with an odd value. Subsequently, the decoder increases the size of the second cluster without increasing the size of the first cluster (e.g., step 1). In some cases, this selective growth (e.g., increasing a size of one cluster while maintaining a size of another cluster) is performed to improve an efficiency in cluster growth (e.g., increase a cluster that is more likely to form a valid cluster). Then, the decoder increases again the size of the second cluster without increasing the size of the first cluster (e.g., step 2). In some cases, a cluster for growth is selected again after each step. For example, at step 3, the decoder increases the size of the first cluster without increasing the size of the second cluster, and at step 4, the decoder increases the size of the second cluster without increasing the size of the first cluster. Thereafter, the decoder determines that the first cluster and the second cluster has a common qubit, and merges the two clusters to form a merged cluster. Based on a determination that the merged cluster has an even number of syndromes having odd values (e.g., the merged cluster has two syndromes having odd values), the decoder determines that the merged cluster is valid. The valid cluster can be reconstructed to correct for one or more errors included in the valid cluster. In some embodiments, the decoder reconstructs qubit states and/or syndrome states within the valid cluster.

Figure 5G:
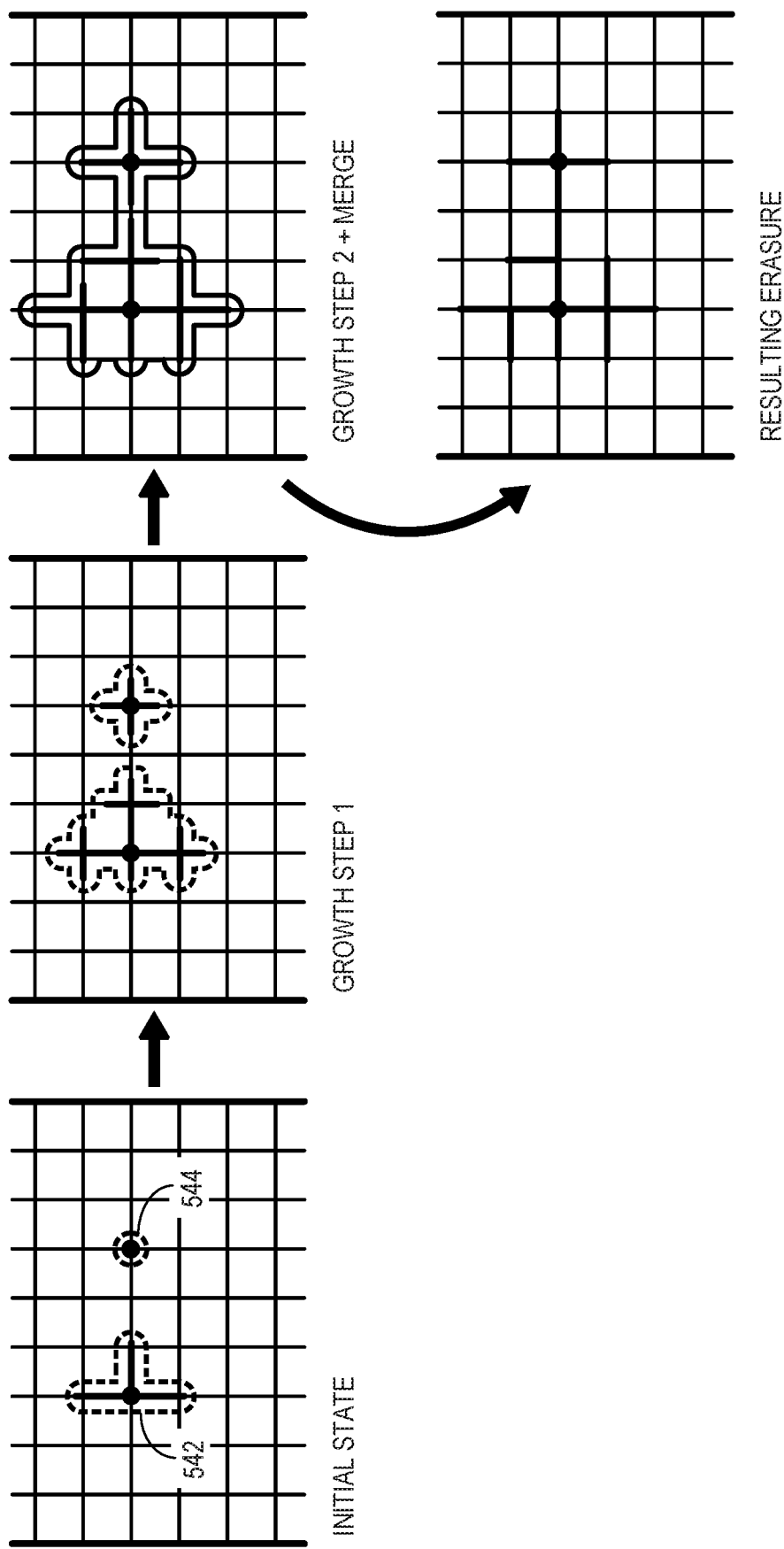

FIG. 5G illustrates operations for correcting errors in accordance with some embodiments. The lattice shown in FIG. 5G has the same two invalid clusters 542 and 544 shown in FIG. 5F. In FIG. 5G, the decoder grows the clusters uniformly, instead of the selective growth illustrated in FIG. 5F. For example, the decoder increases the size of both the first cluster and the second cluster (e.g., steps 1 and 2). The decoder determines that the first cluster and the second cluster have a common syndrome, and merges the two clusters to form a merged cluster. Based on a determination that the merged cluster has an even number of syndromes having odd values (e.g., the merged cluster has two syndromes having odd values), the decoder determines that the merged cluster is valid. The valid cluster can be reconstructed to correct for one or more errors included in the valid cluster. In some embodiments, the decoder reconstructs qubit states and/or syndrome states within the valid cluster.

As shown in FIGS. 5F and 5G, the resulting erasure (e.g., qubits and/or syndromes removed from the lattice for reconstruction) is smaller with the selective growth than with the uniform growth. Thus, the selective growth allows faster reconstruction, as fewer qubits and/or syndromes need to be constructed with the selective growth than with the uniform growth.

FIG. 5H illustrates operations for correcting errors in accordance with some embodiments. The lattice shown in FIG. 5H has two invalid clusters 552 and 554. In FIG. 5H, cluster 552 has one syndrome with an odd value and three erased qubits (and three syndromes with even values), and cluster 554 has one syndrome with an odd value. The decoder increases the size of the clusters (e.g., based on a uniform growth method as shown in FIG. 5G or a selective growth method as shown in FIG. 5F) until the decoder determines that the first cluster and the second cluster have a common qubit and/or syndrome. In FIG. 5H, the decoder determines that the first cluster and the second cluster have a common syndrome, and merges the two clusters to form a merged cluster. Subsequent to forming the merged cluster, the decoder removes one or more qubits and/or syndromes from the merged cluster (e.g., qubits and/or syndromes that have been added to the first cluster and/or the second cluster other than the common qubit and/or syndrome). This reduces the size of the merged cluster, and allows faster reconstruction, as fewer qubits and/or syndromes need to be constructed. In some embodiments, based on a determination that the reduced cluster has an even number of syndromes having odd values (e.g., the merged cluster has two syndromes having odd values), the decoder determines that the reduced cluster is valid. The valid cluster can be reconstructed to correct for one or more errors included in the reduced cluster. In some embodiments, the decoder reconstructs qubit states and/or syndrome states within the reduced cluster.

Figure 5I:
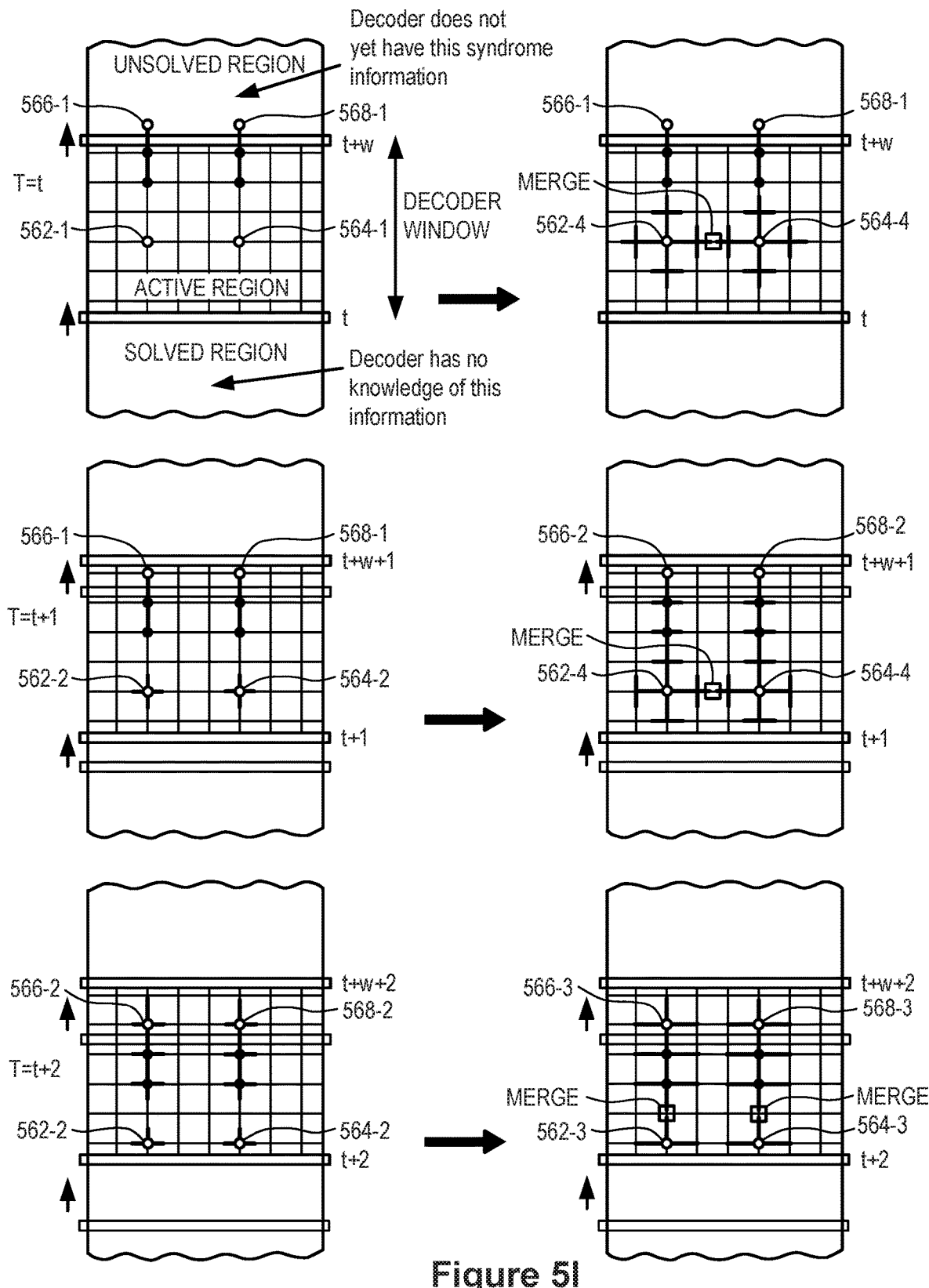

FIG. 5I illustrates operations for correcting errors in accordance with some embodiments. The lattice shown in FIG. 5I has two invalid clusters 562-1 and 564-1 within a subset of entangled qubit states (e.g., a subset represented by a decoder window spanning from time T=t to T=t+w). The subset of entangled qubit states also includes respective portions of clusters 566-1 and 568-1, which are connected to a rough boundary of the decoder window, and thus, assumed to be valid. The decoder increases the size of cluster 562 and 564 until the enlarged clusters 562-4 and 564-4 have a common qubit state and are merged together. Clusters 566-1 and 568-1 are not enlarged, as they are assumed to be valid based on their connections to a rough boundary of the decoder window.

Subsequently, the decoder window is updated to include additional qubit states and/or syndrome states (e.g., in FIG. 5I, the decoder window is shifted to span from T=t+1 to T=t+w+1). The updated window starting at T=t+1 include the entire clusters 566-1 and 568-1, which are no longer in contact with a rough boundary, and thus, are enlarged for one or more generations. For clusters 562 and 564, clusters 562-2 and 564-2, which are two generations before clusters 562-4 and 564-4 that got merged in the previous window, are used instead of clusters 562-4 and 564-4. The enlarged clusters 566-2 and 568-2 come in contact with a rough boundary of the updated window, and thus, are assumed to be valid. The enlarged clusters 562-4 and 564-4, again, have a common qubit state and are merged together.

Thereafter, the decoder window is updated again to include additional qubit states and/or syndrome states (e.g., in FIG. 5I, the decoder window is shifted to span from T=t+2 to T=t+w+2). In the updated window, clusters 566-2 and 568-2 are no longer in contact with a rough boundary, and thus, are enlarged for one or more generations. For clusters 562 and 564, clusters 562-2 and 564-2, which are two generations before clusters 562-4 and 564-4 that got merged in the previous window, are used instead of clusters 562-4 and 564-4. The enlarged clusters 562-3 and 566-3 have a common syndrome state, and thus, are merged. The enlarged clusters 564-3 and 568-3 have a common syndrome state, and thus, are merged.

Although FIGS. 5B-5I illustrate certain operations with particular step numbers, such step numbers should be understood as example sequences of operations in some embodiments. The step numbers do not suggest that the steps having two consecutive numbers have to be performed immediately after one another (e.g., step 2 and step 3 do not need to be performed consecutively). The step numbers do not preclude inclusion of additional operations in between. For example, in some cases, additional operations are performed between step 2 and step 3.

Figure 6A:
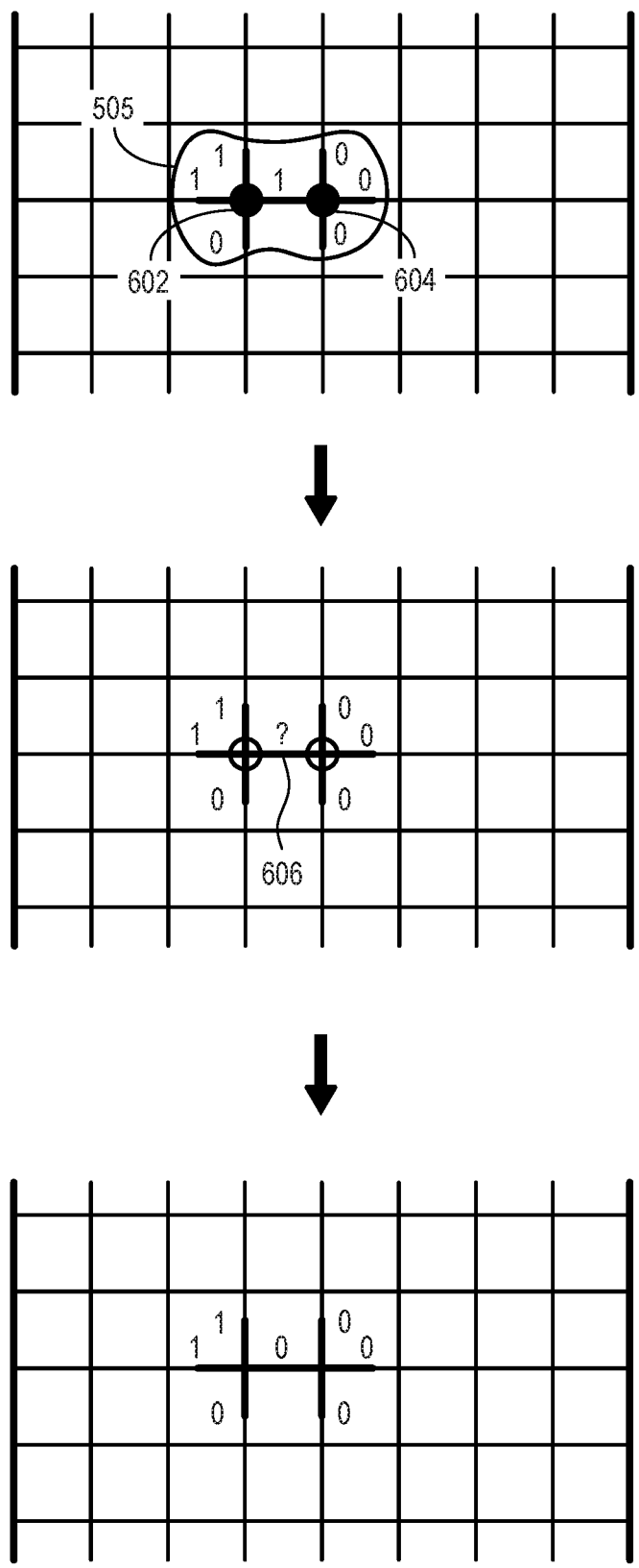
FIGS. 6A and 6B are schematic diagrams illustrating example reconstruction operations in accordance with some embodiments.
Figure 6B:
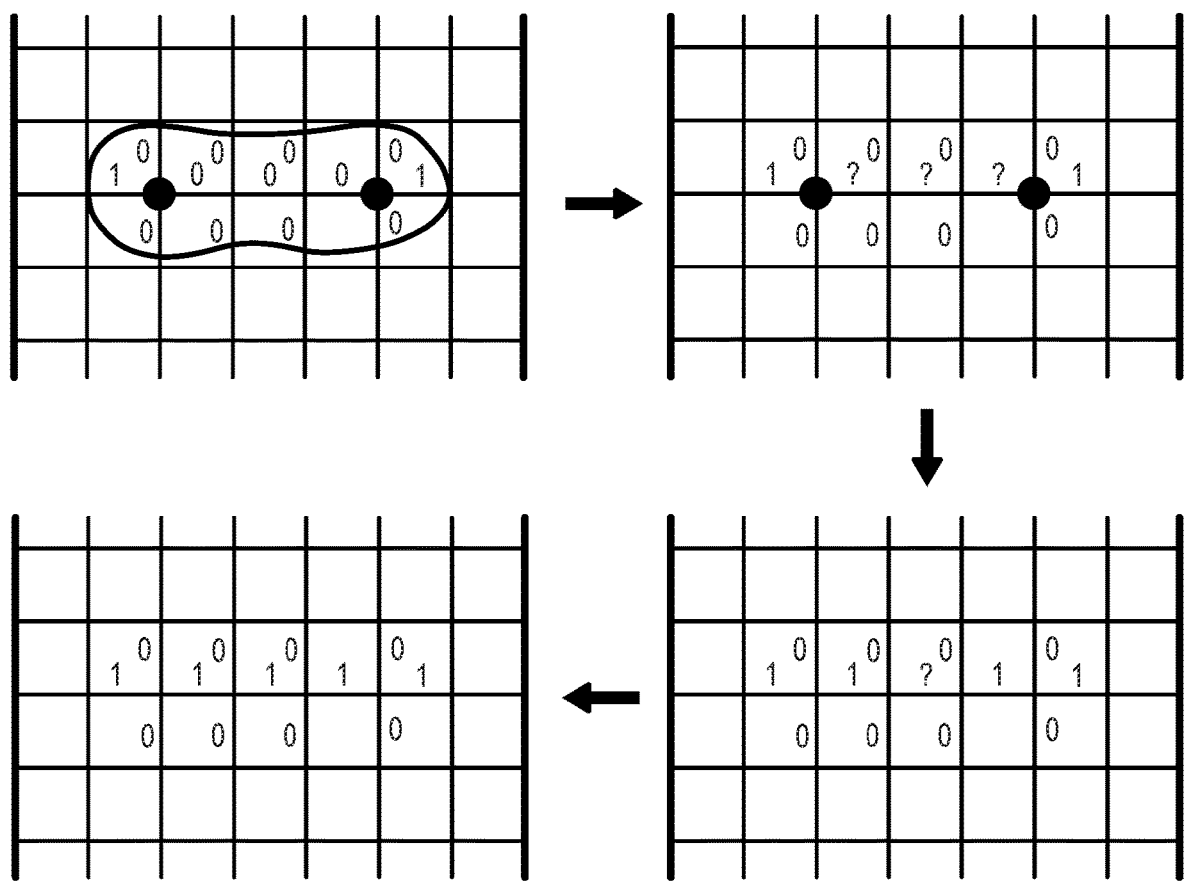

FIGS. 6A and 6B are schematic diagrams illustrating example reconstruction operations in accordance with some embodiments. In some embodiments, the process illustrated by FIGS. 6A-6B is referred to herein as an Erasure Decoder process.

In FIG. 6A, the lattice includes merged cluster 505 shown in FIG. 5B. To illustrate the reconstruction operation, numerical values for qubit states and syndrome states within merged cluster 505 are also shown in FIG. 6.

For reconstruction, the decoder removes (or deletes or sets to an unknown state) at least a subset of qubit states and/or syndrome values in merged cluster 505. For example, as shown in FIG. 6A, non-terminal qubit states and/or syndrome values are removed (e.g., syndrome states for syndromes 602 and 604 and a qubit state for qubit 606 located between syndromes 602 and 604 are removed). In some cases, because qubit states and/or syndrome values outside the merged cluster are fixed, terminal qubit states and/or syndrome values are also predetermined based on the qubit states and/or syndrome values outside the merged cluster. Thus, there is no need to remove the terminal qubit states and/or syndrome values and reconstruct them. However, in some embodiments, all of the qubit states and/or syndrome values are removed.

Subsequently, the decoder estimates correct qubit states and/or syndrome values for the removed qubit states and/or syndrome values. For example, the only qubit state that needs to be reconstructed is for qubit 606. Because the syndromes need to have an even value, and syndromes 602 and 604 each have an even number of qubits having an odd state (e.g., syndrome 602 has two qubits having an odd state and syndrome 604 has no qubit having an odd state), the decoder determines that qubit 606 needs to have an even state. Thus, the decoder sets the qubit state for qubit 606 to an even state (represented by a value of 0). As a result, syndromes 602 and 604 have even values, and the decoder has corrected the error in the lattice (e.g., the decoder has corrected a Pauli error for qubit 606).

FIG. 6B illustrates another example reconstruction operation in accordance with some embodiments. Similar to FIG. 6A, the decoder removes at least a subset of qubit states and/or syndrome states in a merged cluster, and estimates correct qubit states and/or syndrome values for the removed qubit states and/or syndrome values. In some embodiments, as shown in FIG. 6B, the decoder reconstructs the qubit states and/or syndrome values from one or more leaf nodes. In some embodiments, the decoder sequentially reconstructs the qubit states and/or syndrome values (e.g., the decoder reconstructs at least one leaf node based on the qubit states and/or syndrome values adjacent to the leaf node, and reconstructs a neighboring node based on the qubit states and/or syndrome values adjacent to the neighboring node, including the value or state of the reconstructed leaf node).

FIG. 7 is a flowchart representing method 700 of decoding quantum state information, in accordance with some embodiments. Method 700 is performed at a decoder (e.g., decoder 174 in FIG. 2). In some embodiments, the decoder is an electronic decoder. In some embodiments, the decoder includes memory and one or more processors.

The decoder receives (702) information identifying syndrome values for a plurality of entangled qubit states represented by a cluster state with a respective edge of the cluster state corresponding to a respective qubit state of the plurality of entangled qubit states. In some embodiments, the information identifying syndrome values also includes information identifying coordinates of a respective syndrome in the cluster state. The cluster state has at least one boundary with open edges (e.g., a rough boundary). In some embodiments, the cluster state has at least one boundary with closed edges (e.g., a smooth boundary). In some embodiments, a respective vertex of the cluster state corresponds to a syndrome. In some embodiments, the decoder also receives information identifying the plurality of entangled qubit states (e.g., information identifying loss of one or more entangled qubit states). In some embodiments, the information identifying the plurality of entangled qubit states also includes coordinates of a respective qubit state in the cluster state.

The decoder (704) identifies one or more clusters of qubit states and/or syndrome states in the cluster state.

In some embodiments, identifying the one or more clusters in the cluster state includes identifying one or more clusters associated with qubit loss and/or identifying one or more clusters with one or more Pauli errors. In some embodiments, identifying the one or more clusters in the cluster state includes identifying one or more clusters associated with qubit loss and identifying one or more clusters with one or more Pauli errors (e.g., the qubit states represented by the cluster state include loss of quantum states and stochastic error).

The decoder repeats (706) the identifying operation until all of the one or more identified clusters are determined to be valid. At least one cluster of the one or more clusters identified at n+1 generation includes a corresponding cluster of the one or more clusters identified at n generation and at least a portion of qubit states and/or syndrome states adjacent, in the cluster state, to the corresponding cluster of the one or more clusters (e.g., the decoder enlarges, or grows, a respective invalid cluster by adding qubit states and/or syndrome states surrounding the respective invalid cluster).

In some embodiments, one or more qubit states and/or syndrome states adjacent, in the cluster state, to the corresponding cluster at n generation are omitted in the cluster identified at n+1 generation.

The repeating operation includes determining, based on a parity of a respective cluster that is not adjacent to a boundary with open edges, whether the respective cluster is valid; and determining that a respective cluster that is adjacent to a boundary with open edges is valid regardless of a parity of the respective cluster. For example, for a cluster that is not adjacent to a boundary with open edges (e.g., a cluster that is not in contact with a boundary with open edges), whether the cluster is valid or invalid is determined based on a parity of the respective cluster, and for a cluster that is adjacent to a boundary with open edges (e.g., a cluster that is in contact with a boundary with open edges), the cluster is assumed to be valid regardless of the parity of the cluster.

In some embodiments, a particular cluster of the one or more clusters identified at n+1 generation consist of a corresponding cluster of the one or more clusters identified at n generation and at least a portion of qubit states and/or syndrome states directly connected, in the cluster state, to the corresponding cluster of the one or more clusters identified at n generation. For example, a cluster at n+1 generation includes a corresponding cluster at n generation and one or more qubit states and/or syndrome states that are directly connected (e.g., within half an edge distance from the cluster at n generation) to the cluster at n generation.

In some embodiments, a particular cluster of the one or more clusters identified at n+1 generation includes a corresponding cluster of the one or more clusters identified at n generation and at least a portion of qubit states and/or syndrome states directly or indirectly connected, in the cluster state, to the corresponding cluster of the one or more clusters identified at n generation. For example, a cluster at n+1 generation includes a corresponding cluster at n generation and one or more qubit states and/or syndrome states that are located within a particular distance to the cluster at n generation (e.g., a full edge length or more). In some embodiments, the cluster at n+1 generation excludes one or more qubit states and/or syndrome states that are located within the particular distance of the cluster at n generation.

In some embodiments, determining, based on the parity of the respective cluster that is not adjacent to a boundary with open edges, whether the respective cluster is valid includes determining (708) that the respective cluster is valid in accordance with a determination that the parity of the respective cluster that is not adjacent to a boundary with open edges is even and determining that the respective cluster is invalid in accordance with a determination that the parity of the respective cluster that is not adjacent to a boundary with open edges is odd. For example, the decoder determines that the respective cluster is invalid in accordance with a determination that the respective cluster includes an odd number of syndrome states having an odd value, and the decoder determines that the respective cluster is valid in accordance with a determination that the respective cluster includes an even number of syndrome states having an odd value.

In some embodiments, the decoder generates (710) a data structure that includes a cluster identifier for a respective vertex or a respective edge of the cluster state. In some embodiments, the data structure is a two-level tree structure. In increasing the size of respective clusters, it is important to be able to efficiently determine whether two nodes (e.g., vertices or edge nodes) belong to a same cluster. In addition, when two clusters are merged together, it is important to be able to efficiently update data to indicate that the two clusters are now part of a single merged cluster. The inventors have discovered that a cluster identifier can surprisingly improve the speed in determining whether two nodes belong to a same cluster and/or updating data to indicate that two clusters have been merged.

In some embodiments, the decoder, in accordance with a determination that two or more clusters have one or more connecting qubit states and/or syndrome states, merges (712) the two or more clusters. For example, as shown in FIG. 5B, clusters 502-2 and 504-2 are merged in accordance with a determination that clusters 502-2 and 504-2 have a common qubit state, namely qubit state 503.

The decoder reconstructs (714) one or more qubit states and/or syndrome states for respective clusters of the one or more identified clusters based on qubit states and/or syndrome states adjacent to the respective clusters of the one or more identified clusters. For example, as shown in FIG. 6A, one or more qubit states and/or syndrome states are first removed and reconstructed based on qubit states and/or syndrome states adjacent to the one or more removed qubit states and/or syndrome states. In some embodiments, the decoder reconstructs the one or more qubit states and/or syndrome states for respective clusters of the one or more identified clusters based on qubit states and/or syndrome states adjacent to the respective clusters of the one or more identified clusters, using an erasure decoder. For example, in some cases, a linear-time maximum likelihood erasure decoder is used to reconstruct the one or more qubit states and/or syndrome states.

The decoder stores (716) information identifying the one or more reconstructed qubit states and/or syndrome states. For example, the decoder stores the information in memory 206 (FIG. 2).

In some embodiments, a quantum state detector detects quantum states of a second plurality of entangled qubit states that is distinct and separate from the first plurality of entangled qubit states based on the information identifying the one or more reconstructed qubit states and/or syndrome states. In some embodiments, the decoder initiates the quantum state detector to detect quantum states of the second plurality of entangled qubit states. In some embodiments, the decoder initiates a quantum operator (e.g., gate 304) to process the second plurality of entangled qubit states (e.g., perform measurements on the second plurality of entangled qubit states).

It should be understood that the particular order in which the operations in FIG. 7 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, and 1000) are also applicable in an analogous manner to method 700 described above with respect to FIG. 7. For example, decoding clusters located adjacent to a boundary with open edges described above with reference to method 700 optionally has one or more of the characteristics of other decoding methods described herein with reference to other methods described herein (e.g., methods 800, 900, and 1000). For brevity, these details are not repeated here.

FIG. 8 is a flowchart representing method 800 of decoding quantum state information, in accordance with some embodiments. Method 800 is performed at a decoder (e.g., decoder 174 in FIG. 2). In some embodiments, the decoder is an electronic decoder. In some embodiments, the decoder includes memory and one or more processors.

The decoder receives (802) information identifying syndrome values for a first plurality of entangled qubit states represented by a first cluster state with a respective edge of the first cluster state corresponding to a respective qubit state of the plurality of entangled qubit states. In some embodiments, a respective vertex of the cluster state corresponds to a syndrome. In some embodiments, the method also includes receiving information includes identifying the plurality of entangled qubit states.

The decoder repeats (804), for N generations, identifying one or more clusters of qubit states and/or syndrome states in the first cluster state until all of the one or more identified clusters are determined to be valid, including increasing a size of a respective cluster each time the identifying operation is performed so that the respective cluster at n+1 generation includes the respective cluster at n generation and at least a portion of qubit states and/or syndrome states adjacent, in the first cluster state, to the respective cluster at n generation. n is a number selected between, inclusively, 1 and N−1.

The decoder combines (806) at least a portion of the information identifying the syndrome values for the first plurality of entangled qubit states and information identifying syndrome values for a second plurality of entangled qubit states that are adjacent to the first plurality of entangled qubit states, at least the portion of the first plurality of entangled qubit states and the second plurality of entangled qubit states being collectively represented by a second cluster state, the second cluster state including at least a portion of the first boundary within a non-boundary region of the second cluster state.

In some embodiments, the second cluster state has a second boundary that is not included in the first cluster state. The second boundary is away from the first boundary by m vertices. Repeating identifying one or more clusters in the second cluster state includes identifying, initially, the one or more clusters, in the first cluster state, identified at N−k generation, k being equal to, or greater than, m.

In some embodiments, repeating identifying one or more clusters in the second cluster state includes identifying (810), initially, the one or more clusters, in the first cluster state, identified at N−k generation, k being equal to, or greater than, m. In some embodiments, repeating identifying one or more clusters in the second cluster state includes identifying, initially, the one or more clusters, in the first cluster state, identified at N−k generation, k being equal to, or greater than, m times 2.

In some embodiments, m equals 1.

In some embodiments, the second cluster state includes (i) the first cluster state and (ii) the information identifying syndrome values for the second plurality of entangled qubit states.

In some embodiments, the second cluster state includes (i) a subset, less than all, of the first cluster state and (ii) the information identifying syndrome values for the second plurality of entangled qubit states.

In some embodiments, the first cluster state and the second cluster state have respective prism cluster states (e.g., rectangular prism, triangular prism, octagonal prism, etc.).

The decoder repeats (808) identifying one or more clusters of qubit states and/or syndrome states, in the second cluster state, until all of the one or more identified clusters are determined to be valid, including identifying, initially, the one or more clusters, in the first cluster state, identified at a generation prior to the N generation as the one or more clusters in the second cluster state, and increasing a size of a respective cluster each time the identifying operation is performed.

The decoder reconstructs (812) one or more qubit states and/or syndrome states for a respective cluster of the one or more identified clusters based on qubit states and/or syndrome states adjacent to the respective cluster of the one or more identified clusters.

The decoder stores (814) information identifying the one or more reconstructed qubit states and/or syndrome states.

In some embodiments, a quantum state detector detects quantum states of a second plurality of entangled qubit states that is distinct and separate from the first plurality of entangled qubit states based on the information identifying the one or more reconstructed qubit states and/or syndrome states. In some embodiments, the decoder initiates the quantum state detector to detect quantum states of the second plurality of entangled qubit states.

In some embodiments, the device repeats the combining operation and the repeating identifying operations. Information identifying syndrome values for a respective plurality of entangled qubit states (e.g., information identifying syndrome values for qubit states that have not been previously combined) is combined with at least a portion of the previously combined information each time the combining operation is performed.

It should be understood that the particular order in which the operations in FIG. 8 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1000) are also applicable in an analogous manner to method 800 described above with respect to FIG. 8. For example, the decoding for progressively selected subsets of quantum state information described above with reference to method 700 optionally has one or more of the characteristics of other decoding methods described herein with reference to other methods described herein (e.g., methods 700, 900, and 1000). For brevity, these details are not repeated here.

FIG. 9 is a flowchart representing a method of decoding quantum state information, in accordance with some embodiments. Method 900 is performed at a decoder (e.g., decoder 174). In some embodiments, the decoder is an electronic decoder. In some embodiments, the decoder includes memory and one or more processors.

The decoder receives (902) information identifying syndrome values for a plurality of entangled qubit states represented by a cluster state with a respective edge of the cluster state corresponding to a respective qubit state of the plurality of entangled qubit states. In some embodiments, a respective vertex of the cluster state corresponds to a syndrome. In some embodiments, the method also includes receiving information includes identifying the plurality of entangled qubit states.

The decoder identifies (904) a first set of multiple clusters of qubit states and/or syndrome states in the cluster state, the first set of multiple clusters including a first cluster and a second cluster that is distinct and separate from the first cluster.

The decoder, in accordance with a determination that at least one cluster of the first set of multiple clusters is determined to be invalid, identifies (906) a second set of multiple clusters of qubit states and/or syndrome states in the cluster state. The second set of multiple clusters includes a third cluster and the second cluster. The third cluster includes the first cluster and at least a portion of qubit states and/or syndrome states adjacent, in the cluster state, to the first cluster.

In some embodiments, the second cluster of multiple clusters of qubit states is selected based at least in part on a size of the first cluster and a size of the second cluster.

In some embodiments, the second set of multiple clusters of qubit states is selected based at least in part on a shape of the first cluster and a shape of the second cluster.

In some embodiments, the second cluster of multiple clusters of qubit states is selected based at least in part on a distance from the first cluster to a neighboring cluster of the first set of multiple clusters adjacent to the first cluster and a distance from the second cluster to a neighboring cluster of the first set of multiple clusters adjacent to the second cluster.

In some embodiments, the second cluster of multiple clusters of qubit states is selected based at least in part on a number of clusters merged into the first cluster and a number of clusters merged into the second cluster. In some embodiments, the second cluster of multiple clusters is selected based at least in part on a number of times a parity of the first cluster has changed and a number of times a parity of the second cluster has changed.

In some embodiments, the decoder, in accordance with a determination that at least one cluster of the second set of multiple clusters is determined to be invalid, identifies (908) a third set of multiple clusters in the cluster state. The third set of multiple clusters includes a fourth cluster and the second cluster. The fourth cluster includes the third cluster and at least a portion of qubit states and/or syndrome states adjacent, in the cluster state, to the third cluster.

In some embodiments, the decoder, in accordance with a determination that at least one cluster of the second set of multiple clusters is determined to be invalid, identifies (910) a fourth set of multiple clusters in the cluster state. The fourth set of multiple clusters includes the third cluster and a fifth cluster. The fifth cluster includes the second cluster and at least a portion of qubit states and/or syndrome states adjacent, in the cluster state, to the second cluster.

In some embodiments, the decoder, in accordance with a determination that at least one cluster of the second set of multiple clusters is determined to be invalid, identifies (912) a fifth set of multiple clusters in the cluster state. The fifth set of multiple clusters includes a fourth cluster and a fifth cluster. The fourth cluster includes the third cluster and at least a portion of qubit states and/or syndrome states adjacent, in the cluster state, to the third cluster. The fifth cluster includes the second cluster and at least a portion of qubit states and/or syndrome states adjacent, in the cluster state, to the second cluster.

The decoder reconstructs (914) one or more qubit states and/or syndrome states for a respective set of multiple clusters that are deemed to be valid based on qubit states and/or syndrome states adjacent to the respective set of multiple clusters that are deemed to be valid.

The decoder stores (916) information identifying the one or more reconstructed qubit states and/or syndrome states.

In some embodiments, a quantum state detector detects quantum states of a second plurality of entangled qubit states that is distinct and separate from the first plurality of entangled qubit states based on the information identifying the one or more reconstructed qubit states and/or syndrome states. In some embodiments, the decoder initiates the quantum state detector to detect quantum states of the second plurality of entangled qubit states.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 1000) are also applicable in an analogous manner to method 900 described above with respect to FIG. 9. For example, the selective growth of one or more clusters described above with reference to method 900 optionally has one or more of the characteristics of other decoding methods described herein with reference to other methods described herein (e.g., methods 700, 800, and 1000). For brevity, these details are not repeated here.

Figure 10:
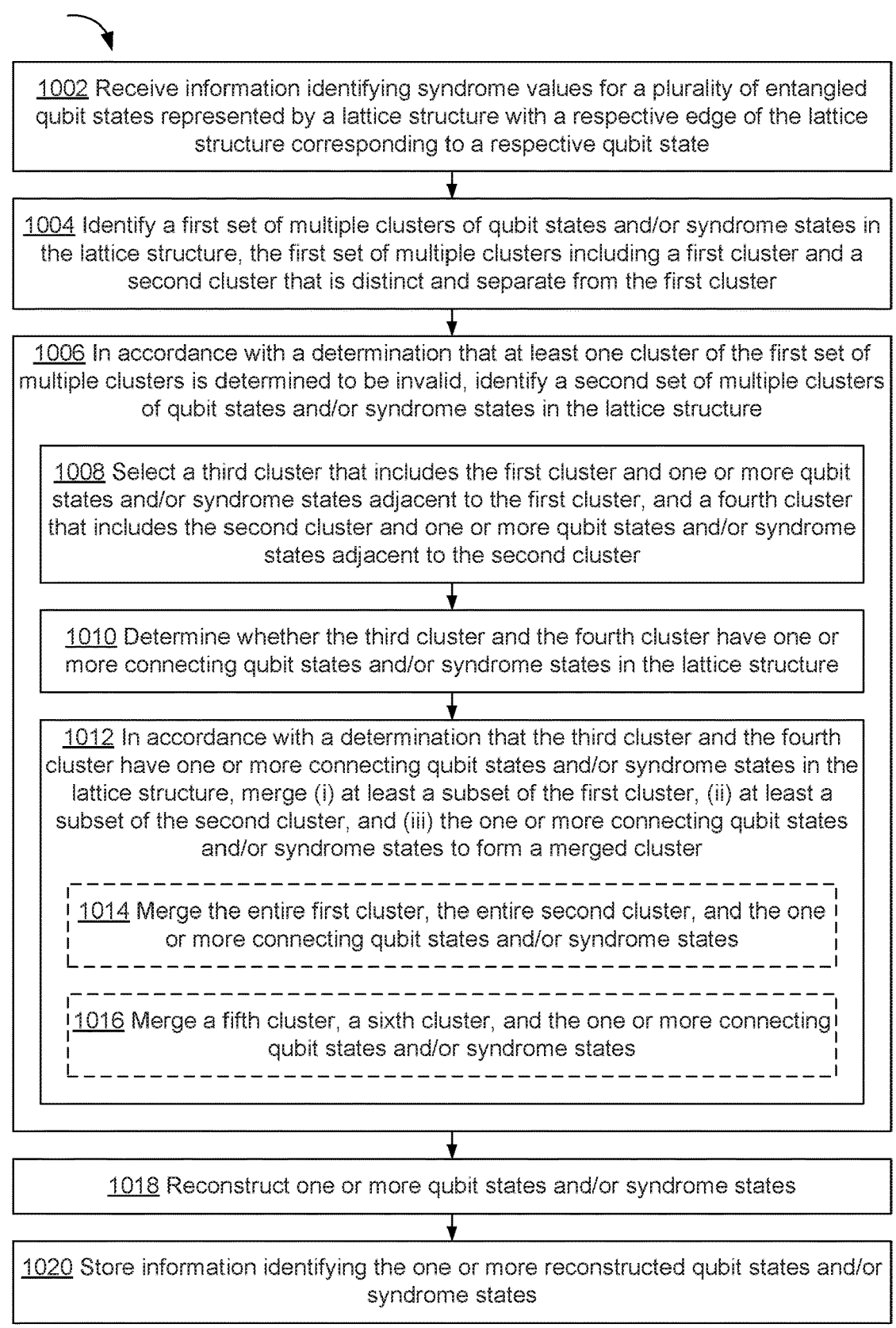
FIG. 10 is a flowchart representing a method of decoding quantum state information, in accordance with some embodiments.

FIG. 10 is a flowchart representing a method of decoding quantum state information, in accordance with some embodiments. Method 1000 is performed at a decoder (e.g., decoder 174). In some embodiments, the decoder is an electronic decoder. In some embodiments, the decoder includes memory and one or more processors.

The decoder receives (1002) information identifying syndrome values for a plurality of entangled qubit states represented by a cluster state with a respective edge of the cluster state corresponding to a respective qubit state of the plurality of entangled qubit states. In some embodiments, a respective vertex of the cluster state corresponds to a syndrome. In some embodiments, the method also includes receiving information includes identifying the plurality of entangled qubit states.

The decoder identifies (1004) a first set of multiple clusters of qubit states and/or syndrome states in the cluster state. The first set of multiple clusters includes a first cluster and a second cluster that is distinct and separate from the first cluster.

The decoder, in accordance with a determination that at least one cluster of the first set of multiple clusters is determined to be invalid, identifies (1006) a second set of multiple clusters of qubit states and/or syndrome states in the cluster state. The decoder selects (1008) a third cluster that includes the first cluster and one or more qubit states and/or syndrome states adjacent, in the cluster state, to the first cluster, and selects a fourth cluster that includes the second cluster and one or more qubit states and/or syndrome states adjacent, in the cluster state, to the second cluster. The decoder determines (1010) whether the third cluster and the fourth cluster have one or more connecting qubit states and/or syndrome states in the cluster state; and, in accordance with a determination that the third cluster and the fourth cluster have one or more connecting qubit states and/or syndrome states in the cluster state, merges (1012) (i) at least a subset of the first cluster, (ii) at least a subset of the second cluster, and (iii) the one or more connecting qubit states and/or syndrome states to form a merged cluster.

In some embodiments, the merged cluster excludes (i) any qubit states and/or syndrome states adjacent, in the cluster state, to the first cluster other than the one or more connecting qubit states and/or syndrome states and (ii) any qubit states and/or syndrome states adjacent, in the cluster state, to the second cluster other than the one or more connecting qubit states and/or syndrome states.

In some embodiments, the decoder merges (1014) the entire first cluster, the entire second cluster, and the one or more connecting qubit states and/or syndrome states to form the merged cluster.

In some embodiments, the first cluster includes a fifth cluster and one or more qubit states and/or syndrome states adjacent, in the cluster state, to the fifth cluster. The second cluster includes a sixth cluster and one or more qubit states and/or syndrome states adjacent, in the cluster state, to the sixth cluster. Merging (i) at least a subset of the first cluster, (ii) at least a subset of the second cluster, and (iii) the one or more connecting qubit states and/or syndrome states to form a merged cluster includes merging (1016) the fifth cluster, the sixth cluster, and the one or more connecting qubit states and/or syndrome states.

The decoder reconstructs (1018) one or more qubit states and/or syndrome states for the merged cluster based on the qubit states and/or syndrome states adjacent to the merged cluster.

The decoder stores (1020) information identifying the one or more reconstructed qubit states and/or syndrome states.

In some embodiments, a quantum state detector detects quantum states of a second plurality of entangled qubit states that is distinct and separate from the first plurality of entangled qubit states based on the information identifying the one or more reconstructed qubit states and/or syndrome states. In some embodiments, the decoder initiates the quantum state detector to detect quantum states of the second plurality of entangled qubit states.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 900) are also applicable in an analogous manner to method 1000 described above with respect to FIG. 10. For example, reducing a merged cluster as described above with reference to method 1000 optionally has one or more of the characteristics of other decoding methods described herein with reference to other methods described herein (e.g., methods 700, 800, and 900). For brevity, these details are not repeated here.

As described above, in some embodiments, the Union-Find decoder can be implemented in three steps: 1. Grow erased clusters until all clusters support a valid syndrome. 2. Find a spanning forest of the grown clusters. 3. Find an estimation of the error $E_Z$ inside this forest starting from its leaves.

In the absence of a boundary, clusters supporting a valid syndrome are the clusters containing an even number of vertices of non-trivial syndrome. That is, for a component to be correctable, it must contain an even number of '-1' syndrome measurement outcomes. This must be the case, as the correction operator will be contained entirely within the erasure. In the case with boundary, in addition to even clusters, any cluster connected to a rough boundary is valid.

When there are errors outside the erasure, the components may be either an erased subgraph, or an isolated vertex. Some of these components may contain an odd number of syndrome vertices. In these 'odd' clusters it is not possible to find a correction within the erasure. The decoder can then grow these odd clusters by adding virtual erasures, until the resulting graph contains only even components. This process is referred to herein as 'syndrome validation'. After syndrome validation is complete, the erasure decoder can be applied to find a correction for the valid clusters. The main difficulty is to efficiently update the list of clusters as they grow. This update, which gives the dominant contribution to the decoding complexity, is realized by exploiting tree data structures for the union-find processing.

At the beginning of the decoding, two types of clusters are defined, an erased cluster for each connected component of the erasure and a syndrome cluster for each syndrome outside the erasure, which contain only an isolated vertex. The set of edges of a cluster as well as other relevant properties of this cluster are stored as a tree that we call the cluster tree. The root of the tree is an arbitrary vertex of the cluster. The cluster tree is constructed by adding a vertex for each edge of the cluster, where each vertex is connected directly to the root, resulting in a tree of depth 0 or 1. The root contains (i) the size of the cluster, e.g., its number of edges, (ii) its parity, e.g., the parity of the number of syndromes included in the cluster and (iii) a boundary indicator that takes the value 1 if an only if the cluster is connected to a rough boundary. Property (i) will be used to compare the size of the clusters, while (ii) and (iii) will allow us to determine non-valid clusters.

During the decoding, these trees will be combined in order to represent fused clusters, by making use of the UNION-FIND algorithm. This approach is based on two functions: UNION and FIND. FIND(v), takes a vertex, v, and returns the root of a cluster tree. This function can be used to determine if two vertices live in the same cluster. Once the root is found, one can also read the size and the parity of the cluster. The function UNION(v, v') realizes the fusion of two clusters. It returns the root of a cluster tree that contains both the edges of the cluster of v and those of the cluster of v'.

Figure 11:
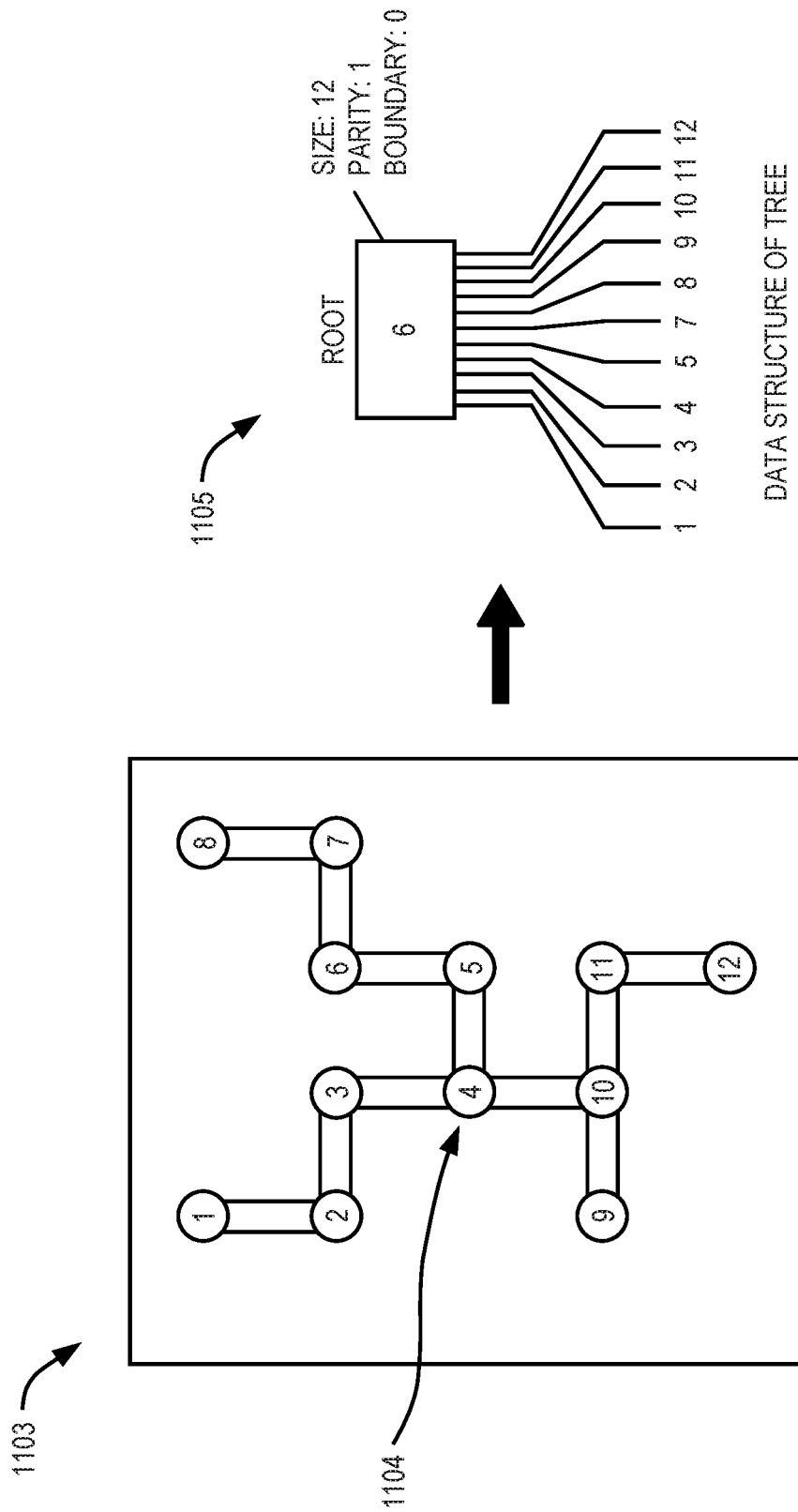
FIG. 11 shows a syndrome graph represented as a tree structure, in accordance with some embodiments.

FIG. 11 illustrates a cluster of errors 1103 in a syndrome graph, also referred to herein as a syndrome cluster, or simply a cluster, and how this data can be represented as a tree data structure 1103. In this example, the cluster 1103 includes a single odd parity check at vertex 1104 with the remaining vertices even (i.e., cluster 1103 is what is referred to herein as an invalid cluster). Equivalently, the set of edges of a syndrome cluster 1103 is stored as a tree, which we refer to as a cluster tree, shown here as cluster tree 1105. The root of the tree can be chosen as any arbitrary vertex of the cluster. The cluster tree data structure is then constructed by adding a vertex for each edge of the cluster. Those vertices are then connected directly to the root, such that the tree has depth 0 or 1.

In accordance with one or more embodiments a method for Union-Find decoding can proceed according to the following steps:

In step 1201, create a cluster tree for each syndrome cluster and for each erased cluster.

In step 1203, create a list of boundary vertices for each cluster.

In step 1205, create a list of non-valid clusters.

In step 1207, the decoder iterates over the list of non-valid clusters created in step 1209 and for each iteration will perform the following sub-steps: i) using the boundary list, grow the cluster $C_i$ by increasing its radius by ½ an edge; ii) Update the boundary list; ii) If $C_i$ meets another cluster, fuse them with UNION and update the root and its data; iii) if $C_i$ is even or is connected to a rough boundary, remove it from the non-valid cluster list.

In step 1209, the process checks the cluster list and detects whether there are any additional invalid clusters. If yes, step 1207 and its sub-steps are repeated. If no, the process proceeds to step 1211.

In step 1211, all the edges that are fully included in the grown cluster are erased.

In step 2013, the erasure decoder is applied as described above in reference to FIGS. 6A-6B.

The first step of the Union-Find decoder described above can be divided into two blocks. The first block contains steps 1201, 1203 and 1205 and creates the list of clusters. The second block grows and fuses odd clusters until they disappear (steps 1207,1209)). The remainder of the algorithm is the erasure decoder as described above. Both block 1 and 2 rely on a UNION-FIND process that is illustrated above in reference to FIGS. 5A-5I and also described below.

Consider the first block. It returns the list of the connected components of a graph (the erased subgraph). In order to build this list, the routine starts with an empty edge set. At the beginning, each component is reduced to a single vertex and the all the edges of the graph are added sequentially. When an edge is added, either its two endpoints belong to the same component, or their components are fused. This requires two functions: FIND(u), that returns an index identifying the connected component of a vertex u (needed in order to compare two components), and UNION(u,v) that fuses the connected components of u and v when they are distinct.

The second block, which grows and fuses odd clusters can also be reduced to applications of UNION and FIND. The only difference here is that the routine stores a list of boundary vertices. This list allows the encoder to keep track of which nodes have already been addressed, and so the encoder can grow the clusters at a linear cost. When two clusters are fused one is simply appended at the end of the other and the boundary is updated. Throughout the whole algorithm, each vertex appears a bounded number of times as a boundary, yielding a linear contribution to the complexity. Hence, analyzing UNION-FIND algorithms for the first block is sufficient.

Naive Algorithm

In a naive approach, each connected component is represented by a list of its vertices. The encoder then can store, for each vertex, the index of its connected component. The function FIND, which returns this index, has a constant cost. To fuse two distinct components $C_u$ and $C_v$, the encoder appends the list of vertices $C_v$ at the end of the vertex list of $C_u$ and updates the component index for all vertices of $C_v$. While running these functions FIND and UNION to generate the connected components of graph with n edges and m vertices, FIND is called 2n times and UNION up to n−1 times. The calling of UNION may require a number of updates to the component index that is itself linear in n, leading to a quadratic complexity $O(m+n^2)$ overall.

Weighted Union

In order to reduce the complexity of updating the component index, the decoder can instead choose to append the smallest list to the end of the largest one. In doing this, the size of the small component at least doubles at each call of UNION. This proves that every vertex index is updated at most log 2(n) times, and the complexity is reduced to O(m+n log n). This approach also requires the size of each component to be stored, but this does not affect the complexity.

Tree Representation and Path Compression

A further simplification referred to herein as "path compression" leads to an optimal decoding process for the Union-Find decoder. In order to speed up the update of the small component during UNION, come embodiments can modify the way the connected components are stored in memory. This modification increases the cost of the FIND method but the overall complexity drops to $O(n\alpha(n))$.

In this example, connected components are represented in memory as trees, each having a unique root vertex. FIND(v) returns the root of the tree, identifying the component of v. This procedure requires a walk to be made inside the tree from v to the root. The cost of FIND is therefore given by the depth of the tree. The depth will be kept small by making use of path compression during the union of two components. When UNION(u, v) is applied, the encoder first checks if u and v belong to the same cluster by checking whether FIND(u) and FIND(v) are equal. If the components are distinct, the trees are fused in two steps. First, the smallest component (say $C_v$) is added as a subtree of the root u of the largest component (Ca). Second, all the vertices reached while traversing the tree from u and v to their respective roots are modified so that they point directly to their root. This second step is the path compression and it is done inside the FIND function, ensuring that the complexity is not increased.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first cluster state could be termed a second cluster state, and, similarly, a second cluster state could be termed a first cluster state, without departing from the scope of the various described implementations. The first cluster state and the second cluster state are both cluster states, but they are not the same cluster state unless explicitly stated as such.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
at a decoder of a quantum computing system:
receiving information identifying syndrome values for a plurality of entangled qubit states represented by a graph state with a respective edge of the graph state corresponding to a respective qubit state of the plurality of entangled qubit states, the graph state having at least one boundary with open edges;
identifying one or more clusters of at least one of: qubit states and syndrome states in the graph state;
repeating the identifying operation until all of the one or more identified clusters are determined to be valid, at least one cluster of the one or more clusters identified at n+1 generation including a corresponding cluster of the one or more clusters identified at n generation and at least a portion of qubit states or syndrome states adjacent, in the graph state, to the corresponding cluster of the one or more clusters, including:
determining, based on a parity of a respective cluster that is not adjacent to a boundary with open edges, whether the respective cluster is valid; and
determining that a respective cluster that is adjacent to a boundary with open edges is valid regardless of a parity of the respective cluster;
reconstructing one or more qubit states or syndrome states for respective clusters of the one or more identified clusters based on qubit states or syndrome states adjacent to the respective clusters of the one or more identified clusters; and
storing information identifying the one or more reconstructed qubit states or syndrome states.

2. The method of claim 1, wherein:
identifying the one or more clusters in the graph state includes at least one of:
identifying one or more clusters associated with qubit loss; and
identifying one or more clusters with one or more Pauli errors.

3. The method of claim 1, wherein:
determining, based on the parity of the respective cluster that is not adjacent to a boundary with open edges, whether the respective cluster is valid includes determining that the respective cluster is valid in accordance with a determination that the parity of the respective cluster that is not adjacent to a boundary with open edges is even and determining that the respective cluster is invalid in accordance with a determination that the parity of the respective cluster that is not adjacent to a boundary with open edges is odd.

4. The method of claim 1, wherein:
a particular cluster of the one or more clusters identified at n+1 generation consist of a corresponding cluster of the one or more clusters identified at n generation and at least a portion of qubit states or syndrome states directly connected, in the graph state, to the corresponding cluster of the one or more clusters identified at n generation.

5. The method of claim 1, further comprising:
generating a data structure that includes a cluster identifier for a respective vertex or a respective edge of the graph state.

6. The method of claim 1, further comprising:
in accordance with a determination that two or more clusters have one or more connecting qubit states or syndrome states, merging the two or more clusters.

7. The method of claim 1, further comprising:
at a quantum state detector, detecting quantum states of a second plurality of entangled qubit states that is distinct and separate from the first plurality of entangled qubit states based on the information identifying the one or more reconstructed qubit states or syndrome states.

8. An electronic decoder of a quantum computing system, the electronic decoder comprising:
one or more processors; and
memory storing one or more programs for execution by the one or more processors, the one or more programs including instructions for performing the method of claim 1.

9. A non-transitory computer readable storage medium storing one or more programs, the one or more programs including instructions, which, when executed by a decoder of a quantum computing system having one or more processors and memory, cause the decoder to perform the method of claim 1.

10. A method, comprising:
at a decoder of a quantum computing system:
receiving information identifying syndrome values for a first plurality of entangled qubit states represented by a first graph state with a respective edge of the first graph state corresponding to a respective qubit state of the plurality of entangled qubit states;
repeating, for N generations, identifying one or more clusters of at least one of: qubit states and syndrome states in the first graph state until all of the one or more identified clusters are determined to be valid, including increasing a size of a respective cluster each time the identifying operation is performed so that the respective cluster at n+1 generation includes the respective cluster at n generation and at least a portion of qubit states or syndrome states adjacent, in the first graph state, to the respective cluster at n generation;
combining at least a portion of the information identifying the syndrome values for the first plurality of entangled qubit states and information identifying syndrome values for a second plurality of entangled qubit states that are adjacent to the first plurality of entangled qubit states, at least the portion of the first plurality of entangled qubit states and the second plurality of entangled qubit states being collectively represented by a second graph state, the second graph state including at least a portion of the first boundary within a non-boundary region of the second graph state;
repeating identifying one or more clusters of at least one of: qubit states and syndrome states, in the second graph state, until all of the one or more identified clusters are determined to be valid, including identifying, initially, at least a subset of the one or more clusters, in the first graph state, identified at a generation prior to the N generation as at least a subset of the one or more clusters in the second graph state, and increasing a size of a respective cluster each time the identifying operation is performed;
reconstructing one or more qubit states or syndrome states for a respective cluster of the one or more identified clusters based on qubit states or syndrome states adjacent to the respective cluster of the one or more identified clusters; and storing information identifying the one or more reconstructed qubit states or syndrome states.

11. The method of claim 10, wherein:

the second graph state has a second boundary that is not included in the first graph state;

the second boundary is away from the first boundary by m vertices; and repeating identifying one or more clusters in the second graph state includes identifying, initially, the one or more clusters, in the first graph state, identified at N–k generation, k being equal to, or greater than, m.

12. The method of claim 11, wherein m equals 1.

13. The method of claim 10, wherein:

the second graph state includes either (i) the first graph state and (ii) the information identifying syndrome values for the second plurality of entangled qubit states, or (iii) a subset, less than all, of the first graph state and (iv) the information identifying syndrome values for the second plurality of entangled qubit states.

14. A method, comprising:

at a decoder of a quantum computing system:

receiving information identifying syndrome values for a plurality of entangled qubit states represented by a graph state with a respective edge of the graph state corresponding to a respective qubit state of the plurality of entangled qubit states;

identifying a first set of multiple clusters of at least one of: qubit states and syndrome states in the graph state, the first set of multiple clusters including a first cluster and a second cluster that is distinct and separate from the first cluster;

in accordance with a determination that at least one cluster of the first set of multiple clusters is determined to be invalid, identifying a second set of multiple clusters of at least one of: qubit states and syndrome states in the graph state, the second set of multiple clusters including a third cluster and the second cluster, the third cluster including the first cluster and at least a portion of qubit states or syndrome states adjacent, in the graph state, to the first cluster;

reconstructing one or more qubit states or syndrome states for a respective set of multiple clusters that are deemed to be valid based on qubit states or syndrome states adjacent to the respective set of multiple clusters that are deemed to be valid; and storing information identifying the one or more reconstructed qubit states or syndrome states.

15. The method of claim 14, wherein:

the second cluster of multiple clusters of qubit states is selected based at least in part on one or more of: a size of the first cluster and a size of the second cluster, a shape of the first cluster and a shape of the second cluster, a distance from the first cluster to a neighboring cluster of the first set of multiple clusters adjacent to the first cluster and a distance from the second cluster to a neighboring cluster of the first set of multiple clusters adjacent to the second cluster, and a number of clusters merged into the first cluster and a number of clusters merged into the second cluster.

16. The method of claim 14, further comprising:

in accordance with a determination that at least one cluster of the second set of multiple clusters is determined to be invalid, performing one of the following:

identifying a third set of multiple clusters in the graph state, the third set of multiple clusters including a fourth cluster and the second cluster, the fourth cluster including the third cluster and at least a portion of qubit states or syndrome states adjacent, in the graph state, to the third cluster;

identifying a fourth set of multiple clusters in the graph state, the fourth set of multiple clusters including the third cluster and a fifth cluster, the fifth cluster including the second cluster and at least a portion of qubit states or syndrome states adjacent, in the graph state, to the second cluster; and identifying a fifth set of multiple clusters in the graph state, the fifth set of multiple clusters including a fourth cluster and a fifth cluster, the fourth cluster including the third cluster and at least a portion of qubit states or syndrome states adjacent, in the graph state, to the third cluster, the fifth cluster including the second cluster and at least a portion of qubit states or syndrome states adjacent, in the graph state, to the second cluster.

17. A method, comprising:

at a decoder of a quantum computing system:

receiving information identifying syndrome values for a plurality of entangled qubit states represented by a graph state with a respective edge of the graph state corresponding to a respective qubit state of the plurality of entangled qubit states;

identifying a first set of multiple clusters of at least one of: qubit states and syndrome states in the graph state, the first set of multiple clusters including a first cluster and a second cluster that is distinct and separate from the first cluster;

in accordance with a determination that at least one cluster of the first set of multiple clusters is determined to be invalid, identifying a second set of multiple clusters of at least one of: qubit states and syndrome states in the graph state, including:

selecting a third cluster that includes the first cluster and one or more qubit states or syndrome states adjacent, in the graph state, to the first cluster;

selecting a fourth cluster that includes the second cluster and one or more qubit states or syndrome states adjacent, in the graph state, to the second cluster;

determining whether the third cluster and the fourth cluster have one or more connecting qubit states or syndrome states in the graph state; and in accordance with a determination that the third cluster and the fourth cluster have one or more connecting qubit states or syndrome states in the graph state, merging (i) at least a subset of the first cluster, (ii) at least a subset of the second cluster, and (iii) the one or more connecting qubit states or syndrome states to form a merged cluster;

reconstructing one or more qubit states or syndrome states for the merged cluster based on the qubit states or syndrome states adjacent to the merged cluster; and storing information identifying the one or more reconstructed qubit states or syndrome states.

18. The method of claim 17, wherein:

the merged cluster excludes (i) any qubit states or syndrome states adjacent, in the graph state, to the first cluster other than the one or more connecting qubit states or syndrome states and (ii) any qubit states or syndrome states adjacent, in the graph state, to the second cluster other than the one or more connecting qubit states or syndrome states.

19. The method of claim 17, including:

merging the entire first cluster, the entire second cluster, and the one or more connecting qubit states or syndrome states to form the merged cluster.

20. The method of claim 17, wherein:

the first cluster includes a fifth cluster and one or more qubit states or syndrome states adjacent, in the graph state, to the fifth cluster;

the second cluster includes a sixth cluster and one or more qubit states or syndrome states adjacent, in the graph state, to the sixth cluster; and merging (i) at least a subset of the first cluster, (ii) at least a subset of the second cluster, and (iii) the one or more connecting qubit states or syndrome states to form a merged cluster includes merging the fifth cluster, the sixth cluster, and the one or more connecting qubit states or syndrome states.

\* \* \* \* \*